United States Patent
Xu et al.

(10) Patent No.: US 7,808,302 B2
(45) Date of Patent: Oct. 5, 2010

(54) TYPE OF CHARGE PUMP APPARATUS AND POWER SOURCE CIRCUIT

(75) Inventors: Kunping Xu, Shenzhen (CN); Lizhen Zhang, Shenzhen (CN); Yun Yang, Shenzhen (CN); Wei Feng, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 45 days.

(21) Appl. No.: 12/123,461

(22) Filed: May 19, 2008

(65) Prior Publication Data

US 2008/0284498 A1 Nov. 20, 2008

(30) Foreign Application Priority Data

May 17, 2007 (CN) .......................... 2007 1 0074500

(51) Int. Cl.
  *G05F 1/10* (2006.01)
(52) U.S. Cl. ...................................... 327/536
(58) Field of Classification Search ................. 327/535, 327/536, 537
  See application file for complete search history.

(56) References Cited

U.S. PATENT DOCUMENTS

| | | | | |
|---|---|---|---|---|
| 5,237,209 A | * | 8/1993 | Brewer | 307/110 |
| 5,623,222 A | * | 4/1997 | Tamagawa | 327/259 |
| 6,023,188 A | * | 2/2000 | Lee et al. | 327/536 |
| 6,147,547 A | * | 11/2000 | Ogura et al. | 327/536 |
| 6,184,741 B1 | * | 2/2001 | Ghilardelli et al. | 327/536 |
| 6,922,097 B2 | * | 7/2005 | Chan et al. | 327/536 |
| 7,279,957 B2 | * | 10/2007 | Yen | 327/536 |
| 7,282,985 B2 | * | 10/2007 | Yen et al. | 327/536 |

* cited by examiner

*Primary Examiner*—Jeffrey S Zweizig
(74) *Attorney, Agent, or Firm*—Venture Pacific Law, PC

(57) ABSTRACT

This invention discloses charge pump apparati, where a charge pump apparatus, including a positive charge pump circuit and a negative charge pump circuit, providing multiple positive and negative voltages, comprises: a capacitor set shared by said positive charge pump circuit and said negative charge pump circuit; multiple electronic switches connected to said capacitor set and a plurality of voltage sources; multiple output capacitors connected to selected ones of said multiple electronic switches and one or more output terminals; and a non-overlapping time sequence that controls the on and off states of said multiple electronic switches; wherein under the control of said non-overlapping time sequence, corresponding electronic switches are turned on and off to control the output of the positive and negative voltages provided by said output capacitors to generate output voltages that are pre-determined multiples of the one or more input voltages. With this invention, coupling capacitors are shared during the processes of charging and discharging, and operate at alternating intervals through time sequence-control. As a result, both positive and negative output voltages can be simultaneously adjusted to provide different boost levels. The charge pump is both low in cost and has a design that is simple and easy to produce.

15 Claims, 23 Drawing Sheets

TYPE OF CHARGE PUMP APPARATUS AND POWER SOURCE CIRCUIT

CROSS REFERENCE

This application claims priority from a Chinese patent application entitled "A Type of Charge Pump Apparatus and Power Source Circuit" filed on May 17, 2007, having a Chinese Application No. 200710074500.x. This Chinese application is incorporated here by reference.

FIELD OF THE INVENTION

This invention is related to electrical charge pump circuits and, in particular to, charge pump circuits capable of providing multiple levels of power levels.

BACKGROUND TECHNOLOGY

In most integrated circuit systems, it is necessary for a semiconductor chip ("on-chip") to produce positive high voltage output (VP) and negative high voltage output (VN), the absolute values of which are higher than the input power source voltage (VDD). For example, in liquid crystal display driver apparati, in order to achieve high display quality, both positive and negative high voltage power sources and positive and negative high voltage driving voltages are needed when driving the liquid crystal screen. At this time, a charge pump comprising of one or more electronic switches, such as metal oxide semiconductors (MOS), and one or more coupling capacitors is used to raise an externally-provided voltage to the required high voltage.

FIG. 1 shows the structure of the current charge pump that produces a 2× increased voltage, including input voltage Vin; two electronic switches, S1 and S2, used for charging; two electronic switches, S3 and S4, used for discharging; a coupling capacitor C1; and an output capacitor Co.

FIG. 2 shows the control sequence for the four electronic switches used in the operation of this circuit. Herein, the control signal for electronic switches S1 and S2 and the control signal for electronic switches S3 and S4 do not overlap, and have Break Before Make (BBM) time. During time t1, electronic switches S1 and S2 are on, and electronic switches S3 and S4 are off; input voltage Vin charges capacitor C1; after capacitor C1 has stored a full charge, capacitor C1 stores a charge of value Vin. During time t2, electronic switches S3 and S4 are on, and electronic switches S1 and S2 are off; when input voltage Vin has gone through capacitor C1 to output terminal Vo, output terminal Vo then passes through output capacitor Co to the zero-potential voltage VSS line, and stores a charge with value $2Vin/(C1+Co)$ in output capacitor Co. Suppose C1=Co, without considering the power consumption of the electronic switches and capacitors; through repeated charging and discharging, a charge of value 2Vin can be stored in output capacitor Co, therby obtaining 2× voltage output, i.e. Vo=2Vin.

FIG. 3 shows the structure of the current charge pump that produces −1× increased voltage, including input voltage Vin; two electronic switches, S1 and S2, used for charging; two electronic switches, S3 and S4, used for discharging; a coupling capacitor C1; and an output capacitor Co.

Illustration 4 shows the control sequence for the four electronic switches used in the operation of this circuit. Herein, the control signal for electronic switches S1 and S2 and the control signal for electronic switches S3 and S4 do not overlap, and have BBM time. During time t1, electronic switches S1 and S2 are on, and electronic switches S3 and S4 are off; input voltage Vin charges capacitor C1; after capacitor C1 has stored a full charge, capacitor C1 stores a charge of value Vin. During time t2, electronic switches S3 and S4 are on, and electronic switches S1 and S2 are off; when input voltage Vin has gone through capacitor C1 to output terminal Vo, output terminal Vo then passes through output capacitor Co to the zero-potential voltage VSS line, and stores a charge with value $(0-Vin)/(C1+Co)$ in output capacitor Co. Suppose C1=Co, without considering the power consumption of the electronic switches and capacitors; through repeated charging and discharging, −1× voltage can be obtained, i.e. Vo=−1Vin.

In current charge pump circuits, positive m-times voltage and negative n-times voltage must be simultaneously obtained, usually requiring (m+n−1) coupling capacitors, $m \geq 2$, $n \geq 1$, resulting in a rather large number of coupling capacitors in the charge pump. If the charge pump's coupling capacitors use on-chip capacitors, a large chip area is required, thereby increasing the cost of producing the circuit. If off-chip capacitors are used, the size and cost of the electronic equipment used to install the chip will also be increased. If a system requires multiple charge pumps, this problem only becomes more serious. Therefore, it is desirable to have a charge pump circuit that overcomes the problems of the prior art charge pump circuits.

SUMMARY OF THE INVENTION

An object of this invention is to provide a type of charge pump apparatus that shares capacitors in generating the corresponding boosted positive and negative output voltages.

Another object of this invention is to provide charge pump circuits having low component costs in realizing such an apparatus.

Briefly, the present invention discloses in one aspect a charge pump apparatus, including a positive charge pump circuit and a negative charge pump circuit, providing multiple positive and negative voltages, comprising: a capacitor set shared by said positive charge pump circuit and said negative charge pump circuit; multiple electronic switches connected to said capacitor set and a plurality of voltage sources; multiple output capacitors connected to selected ones of said multiple electronic switches and one or more output terminals; and a non-overlapping time sequence that controls the on and off states of said multiple electronic switches; wherein under the control of said non-overlapping time sequence, corresponding electronic switches are turned on and off to control the output of the positive and negative voltages provided by said output capacitors to generate output voltages that are pre-determined multiples of the one or more input voltages. The embodiments of this invention share one or more coupling capacitors in the process of the charge pump charging and discharging, and, by controlling through time sequences operating at different time intervals, they can simultaneously generate multiples-adjustable, boosted positive voltages and negative voltages.

An advantage of this invention is that it provides a type of charge pump apparatus that shares capacitors in generating the corresponding boosted positive and negative output voltages.

Another advantage of this invention is that it provides charge pump circuits having low component costs in realizing such an apparatus.

DETAILED DESCRIPTION OF THE PREFERRED EMBODIMENTS

In order to further clarify the goals, technology, and advantages of this invention, some illustrations and examples are provided below for more precise explanation. It should be understood that the descriptions provided here are only for clarification purposes, and not to limit the scope of this invention.

In the embodiments of the present invention, the positive and negative charge pump in the charging and discharging process shares the same coupling capacitor; by controlling through time sequence to operate at different time intervals, multiples-adjustable, boosted positive voltage and negative voltage can be generated at the same time, where the boost multiple can be controlled through numeric logic.

Figure 1:
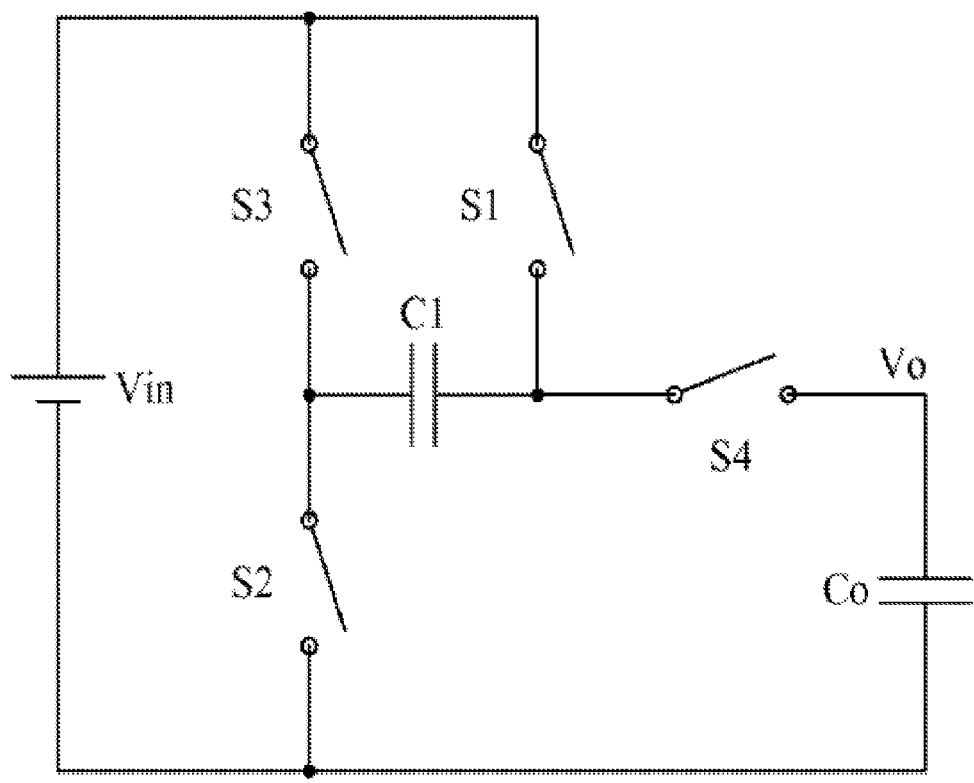
FIG. 1 is a structural diagram of a prior art charge pump, which provides a two time boost.
Figure 2:
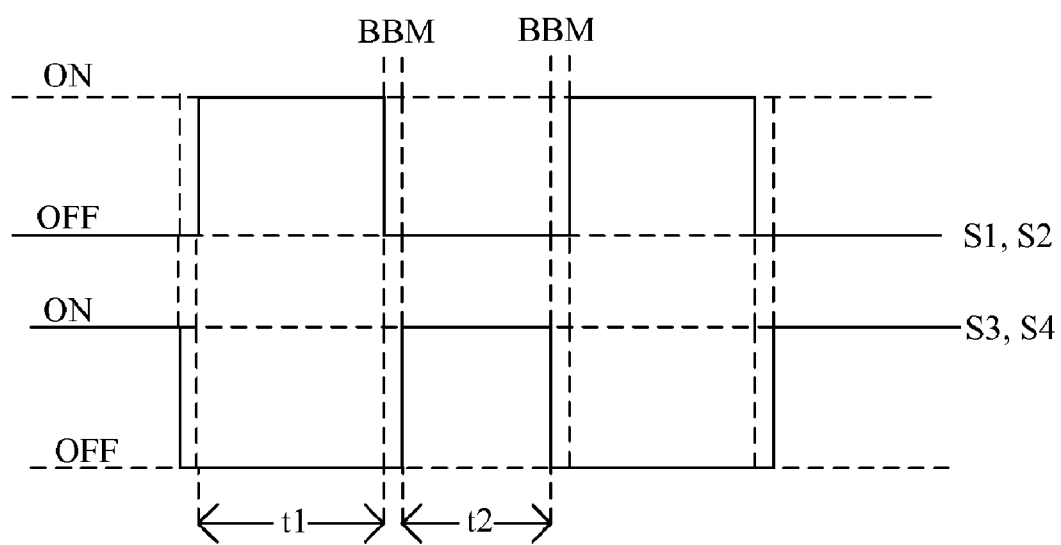
FIG. 2 is a diagram of the control time-sequence for the electronic switches of the charge pump illustrated in FIG. 1.
Figure 3:
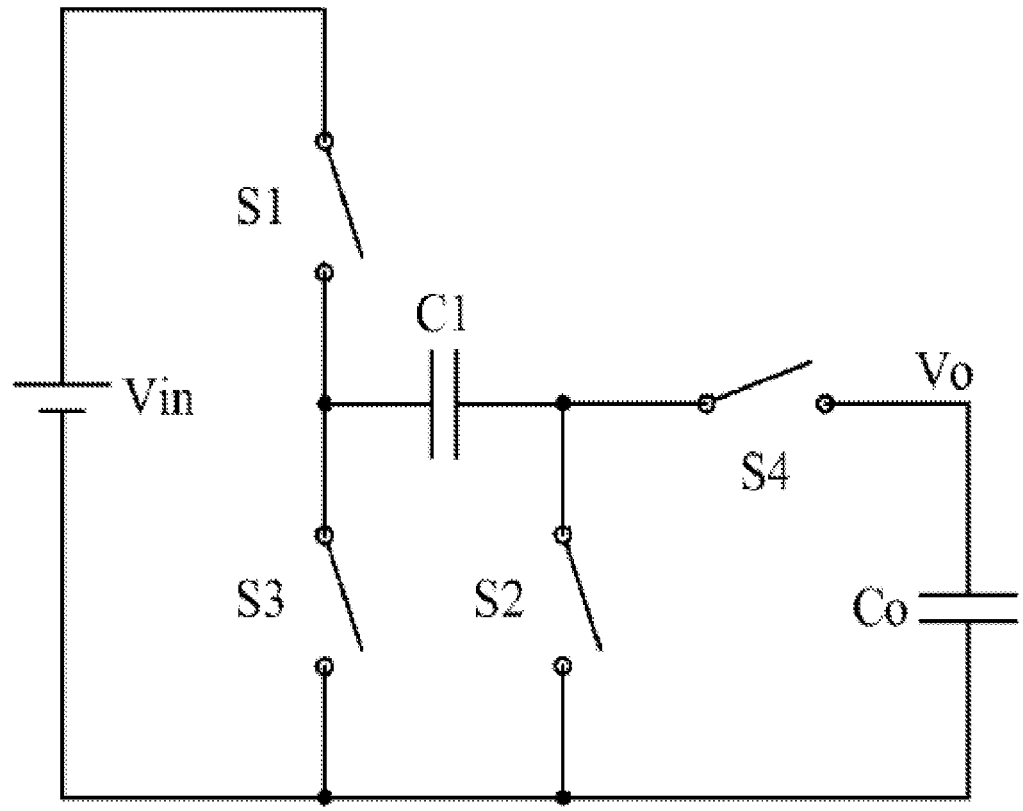
FIG. 3 is a structural diagram of a prior art charge pump, which provides a −1 time boost.
Figure 4:
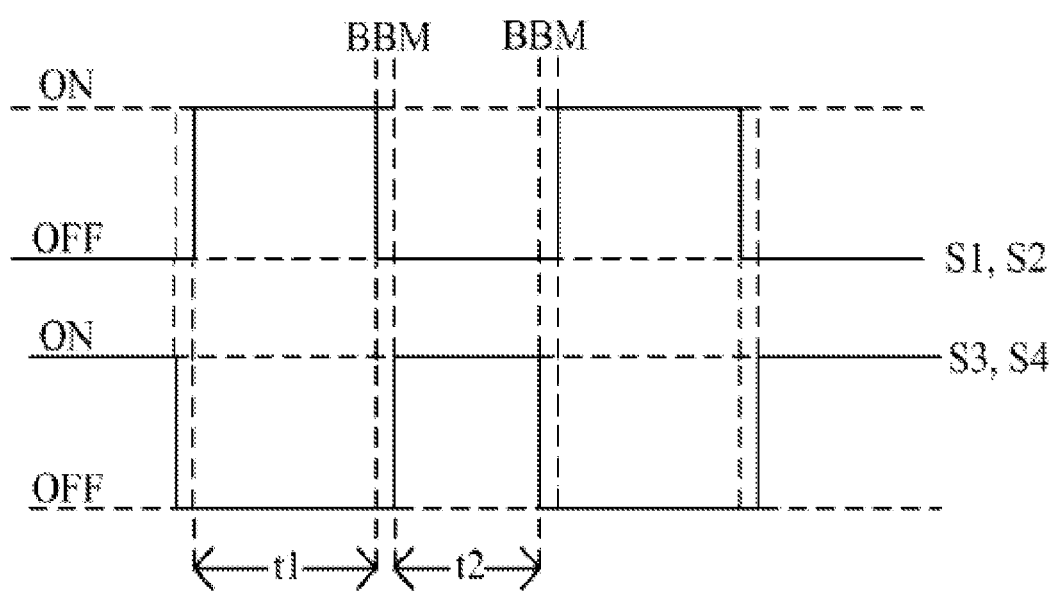
FIG. 4 is a diagram of the control time-sequence for the electronic switches of the charge pump illustrated in FIG. 3.
Figure 5:
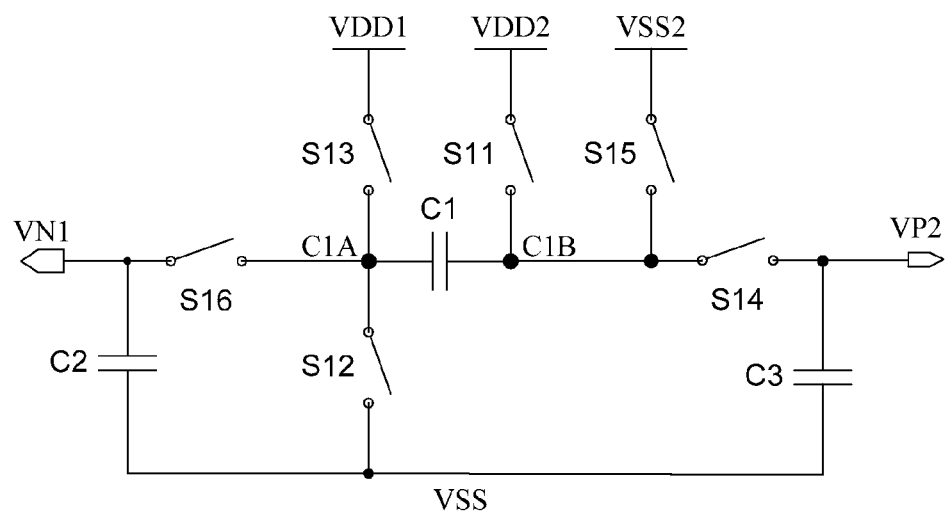
FIG. 5 is a structural diagram showing the sharing of a single coupling capacitor for the charge pumps provided by the embodiments of this invention.

FIG. 5 illustrates a structure where a coupling capacitor is shared in realizing the charge pump structure where the circuit shares the same coupling capacitor; by controlling through the described non-overlapping time sequence, the electronic switches are conducting and non-conducting, controlling the charging and discharging of the capacitors.

Figure 6:
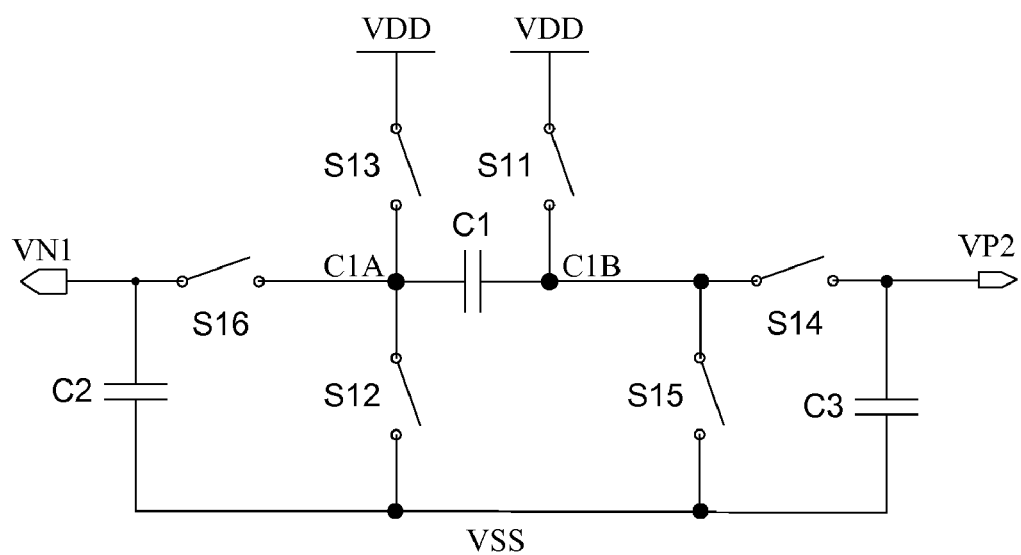
FIG. 6 is a structural diagram serving as a demonstrative example of the sharing of a single coupling capacitor for the charge pumps provided by the embodiments of this invention.
Figure 7:
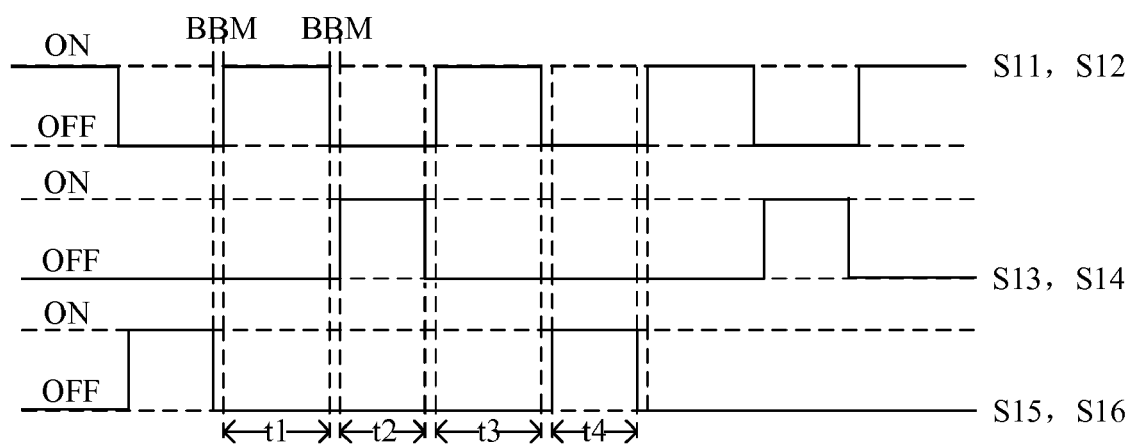
FIG. 7 is a diagram of the control time-sequence for the electronic switches of the charge pump illustrated in FIG. 6.

One terminal of capacitor C1 connects to three electronic switches s12, s13, and s16; electronic switches s12, s13 and s16 separately connect to voltages VSS1, VDD1 and output terminal VN1. The other terminal of capacitor C1 connects to three electronic switches s11, s14, and s15; electronic switches s11, s14, and s15 separately connect to voltage VDD2, output terminal VP2 and voltage VSS2. Through control by using the non-overlapping time sequence, the switches are conducting or non-conducting, and thereby capacitor C1 is charged and discharged, accomplishing In the embodiments of the invention, as illustrated by FIG. 6, when VDD1=VDD2=VDD and VSS1=VSS2=VSS=0, the charge pump can obtain 2 times and −1 time in voltage boost, or VP2=VDD1+VDD2=2VDD and VN1=−VDD2=−VDD. Compared to prior art charge pumps, only one capacitor is needed to obtain 2 times and −1 time in voltage boost, and the cost of the charge pump is lowered. FIG. 7 illustrates the operating time sequence for operating the electronic switches of the charge pumps of FIGS. 5 and 6.

For example, in FIG. 6 during time t1, electronic switches s11 and s12 are conductive, and electronic switches s13, s14, s15, and s16 are non-conductive. The C1B terminal of capacitor C1 connects to the input voltage VDD, and the C1A terminal connects to the zero voltage VSS. Through connecting the input voltage VDD through capacitor C1 to the zero voltage, VSS capacitor C1 is charged and has VDD voltage potential.

During time t2, electronic switches s13 and s14 conduct, electronic switches s11, s12, s15, and s16 do not conduct, the C1A terminal of capacitor C1 connects to voltage source VDD, and the C1 terminal connects to the positive voltage terminal VP2, resulting in a route where input voltage VDD goes through capacitor C1, positive voltage terminal VP2, and output capacitor C2 to zero voltage VSS, where the voltage at positive voltage terminal VP2 is voltage VDD plus the VDD voltage stored in capacitor C1 during time t1 to realize a 2 times boost.

During time t3, the operation of the electronic switches is the same as during time t1, where there is voltage potential VDD between the two terminals of capacitor C1. During time t4, electronic switches s15 and s16 are conductive, electronic switches s11, s12, s13, and s14 are non-conductive, terminal C1B of capacitor C1 connects to zero voltage VSS, and terminal C1A of capacitor C1 connects to negative voltage output terminal VN1, forming a route from zero voltage VSS through capacitor C1, negative voltage terminal VN1, and output capacitor C3 to zero voltage VSS, where the voltage at negative voltage terminal VN1 equals zero voltage VSS minus the voltage potential stored in capacitor C1 during time t3, realizing a boost of −1 time.

If the loss between electronic switches and capacitors is not considered after repeatedly charging and discharging, 2 times positive high output voltage and −1 time negative high output voltage VN1 can be obtained, or VP2=2VDD and VN1=−1VDD.

Figure 8:
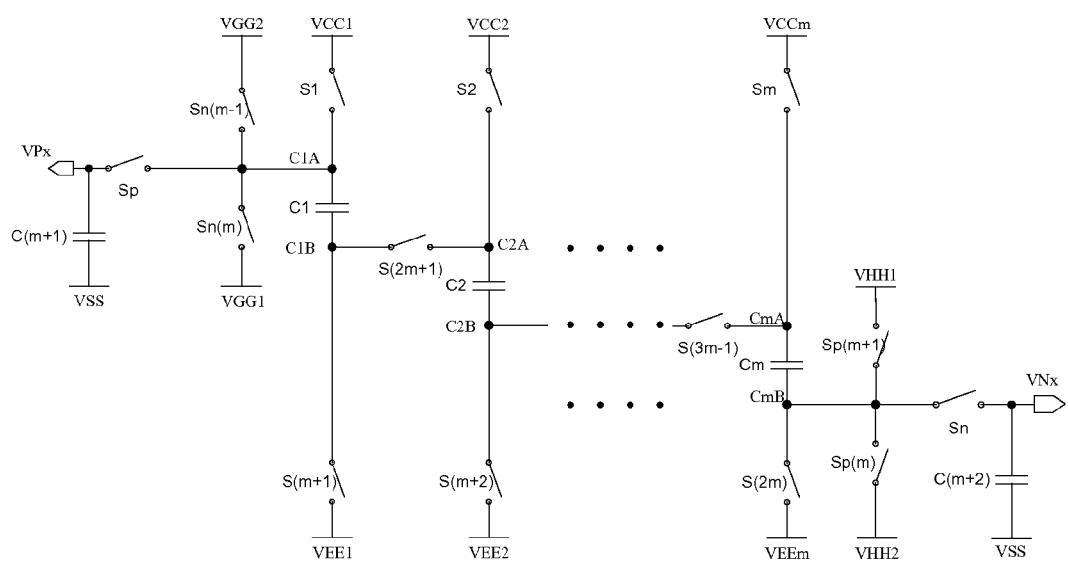
FIG. 8 is a structural diagram showing the sharing of multiple coupling capacitors for the charge pumps provided by the embodiments of this invention.

FIG. 8 illustrates structures of the embodiments of the present invention, where multiple coupling capacitors are shared by the charge pump embodiments of the present invention. Through sharing of m coupling capacitors C1, C2 to Cm and using the non-overlapping control time sequence to control the conductiveness and non-conductiveness of the electronic switches, the capacitors are charged, discharged, and simultaneous generating VPx and VNx output voltage, where the charge pumps have 4 operating modes.

C1, C2 to Cm totaling m capacitors are serially connected and controlled by electronic switches S(2m+1) and S(2m+2)...S(3m−1), where m is a whole number larger or equal to 1. The first terminals of capacitors C1, C2 ... Cm (C1A, C2A ... CmA) respectively connect to electronic switches S1, S2 ... Sm; electronic switches S1, S2 ... Sm respectively connect to VCC1 and VCC2 ... VCCm, and respectively connect to capacitors C1, C2 ... Cm to connect/disconnect to voltages VCC1, VCC2 ... VCCm.

The second terminals of the capacitors C1, C2 ... Cm (C1B, C2B ... CmB) respectively are connected to electronic switches S(m+1), S(m+2) ... S(2m); electronic switches S(m+1), S(m+2)...S(2m) respectively connects to voltages VEE1, VEE2 ... VEEm, respectively controlling capacitors C1, C2 ... Cm to connect/disconnect to voltages VEE1, VEE2 ... VEEm.

Additionally, the first terminal of capacitor C1 is connected to two electronic switches Sn(m), Sn(m−1), electronic switches Sn(m), Sn(m−1) respectively connect to voltages VGG1 and VGG2, separately controlling capacitor C2 to connect/disconnect to voltages VGG1 and VGG2. The first terminal of capacitor C1 is connected to switch Sp; electronic switch Sp is connected to the output terminal VPx, controlling capacitor C1 to output VPx.

The second terminal of capacitor Cm is connected to electronic switches Sp(m) and Sp(m−1); electronic switches Sp(m+1), Sp(m) respectively connect to voltages VHH1 and VHH2, separately controlling capacitor Cm to connect/disconnect to voltages VHH1 and VHH2. One terminal of electronic switch Sn is connected to the output terminal VNx, and the other terminal is connected to the second terminal of Cm, controlling capacitor Cm to output VNx.

Figure 9:
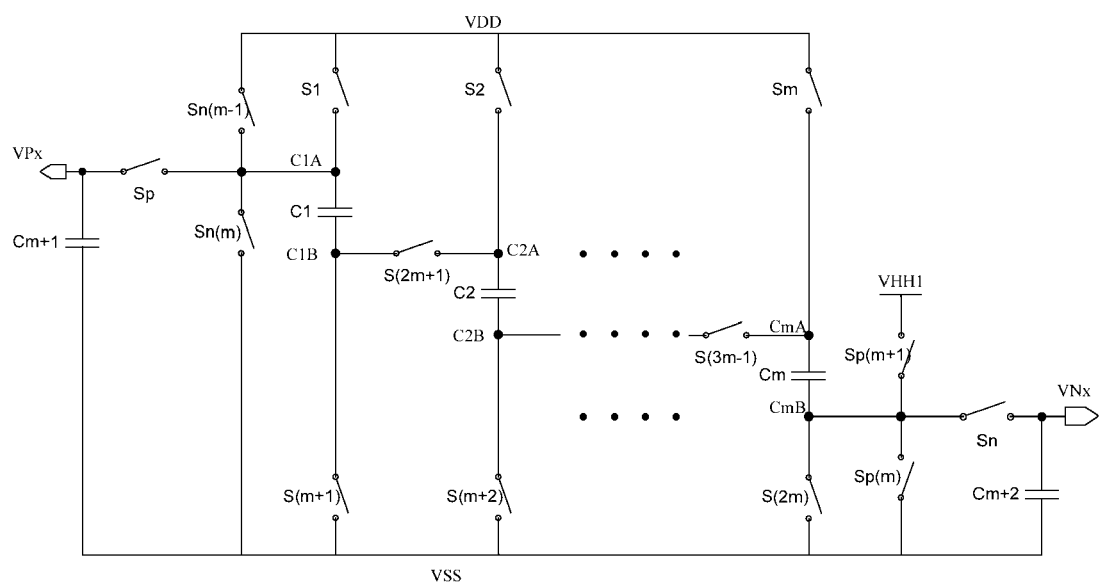
FIG. 9 is a structural diagram serving as a demonstrative example of the sharing of multiple coupling capacitors for the charge pump illustrated in FIG. 8, as provided by the embodiments of this invention.

As illustrated in FIG. 9, when VCC1=VCC2= ... = VCCm=VDD, VEE1=VEE2= ... =VEEm=VSS, VGG1=VSS, VGG2=VDD, VHH1=VDD, and VHH2=VSS, there are four operating modes in the circuit structure: VPx=mVDD and VNx=−mVDD, or VPx=mVDD and VNx=−(m−1)VDD, or VPx=(m+1)VDD and VNx=−mVDD, or VPx=(m+1)VDD and VNx=−(m−1)VDD.

When simultaneously charging capacitors C1, C2 to Cm, electronic switches S1, S2 to S(2m) are conductive, S(2m+1), S(2m+2) to S(3m−1) are non-conductive, electronic switches Sp, Sn, Sp(m), Sp(m+1), Sn(m−1) and Sn(m) are non-conductive, with voltage VDD respectively charging capacitors C1, C2 to Cm, forming voltage potentials VDD across the two terminals of capacitors C1, C2 to Cm.

When simultaneously charging capacitors C1, C2 to Cm, when a pathway is opened, the electronic switches of the other pathways are disconnected; thus, voltage VPx=(m+1) VDD can be obtained through the path from voltage VDD through electronic switch Sp(m+1), capacitors Cm to C1, output terminal VPx, and output capacitors C(m+1) to VSS. High positive voltage VPx=mVDD can be obtained through the path from voltage VSS going through electronic switch Sp(m), capacitors Cm to C1, output terminal VPx, and output capacitors C(m+1) to VSS. High negative voltage VNx=−mVDD can be obtained through the path from voltage VSS through electronic switch Sn(m), capacitors C1, C2 to Cm, output terminal VNx, and output capacitors C(m+2) to VSS. High negative voltage VNx=−(m−1)VDD can be obtained through the pathway from voltage VDD going through electronic switch Sn(m−1), capacitors C1, C2 to Cm, output terminal VNx, and output capacitors C(m+2) to VSS.

When m=−1, disconnecting electronic switch Sn(m−1) and the connection for connecting voltage VDD to the capacitor(s), and electronic switch Sp(m) and the connection for connecting voltage VSS to the capacitor(s), the embodiment for a charge pump structure for sharing one coupling capacitor can be accomplished, realizing 2 times and −1 time output boost.

By the embodiments of the present invention, by connecting multiple charge pump stages, multiple output combinations of positive and negative voltages can be outputted, where the charge pump of each stage shares a capacitor set capable of charging and discharging operations. In one embodiment of the present invention, a prior stage charge pump output voltage can be the next stage input voltage of the charge pump.

Two stage, column-connected charge pumps are described below. For ease of description, the above described charge pump sharing 1 capacitor and generating 2 times positive voltage and −1 time negative voltage is the stage 1 charge pump; its output voltage is the input voltage of the second stage charge pump, and is delivered to the second stage charge pump. The second stage charge pump, through the shared (m−1) capacitors C2, C3 to Cm, generates VPx and VNx high voltage output.

Figure 10:
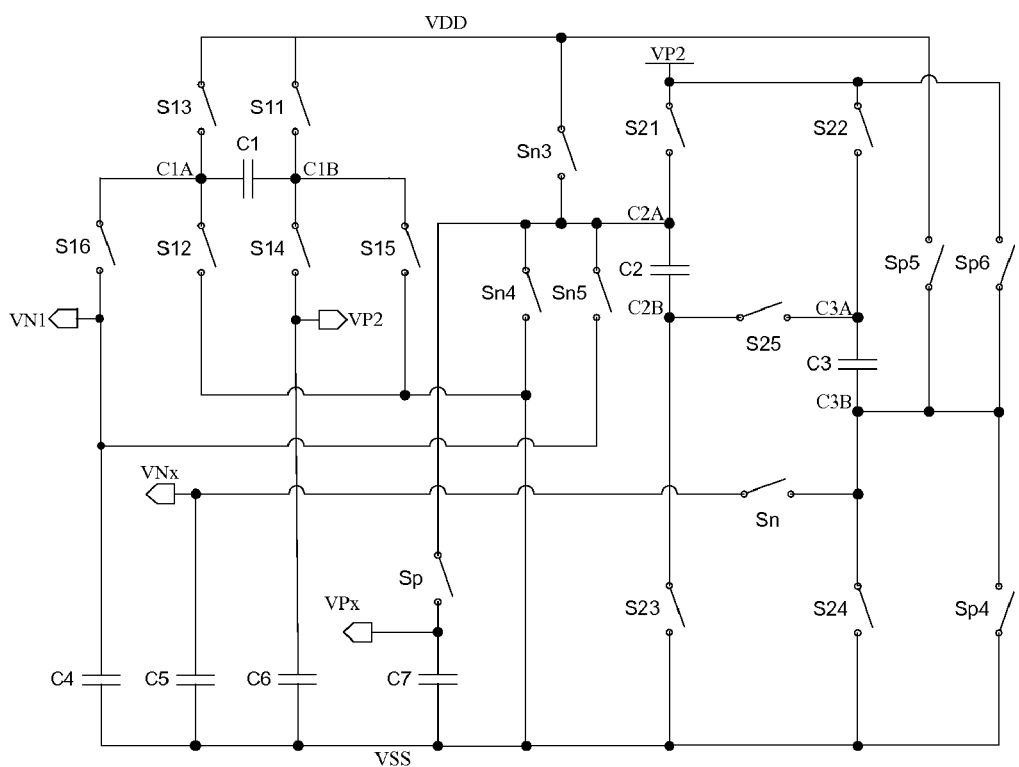
FIG. 10 is a structural diagram serving as a demonstrative example of a two-stage charge pump provided by embodiments of the present invention, where the second stage charge pump shares two coupling capacitors.

FIG. 10 illustrates the structure of a second stage charge pump sharing two coupling capacitors. At this time, the charge pump includes 9 types of operation modes, which can be selected by numeric logic for a specific operating mode to output 9 different types of positive and negative high voltage.

Figure 11:
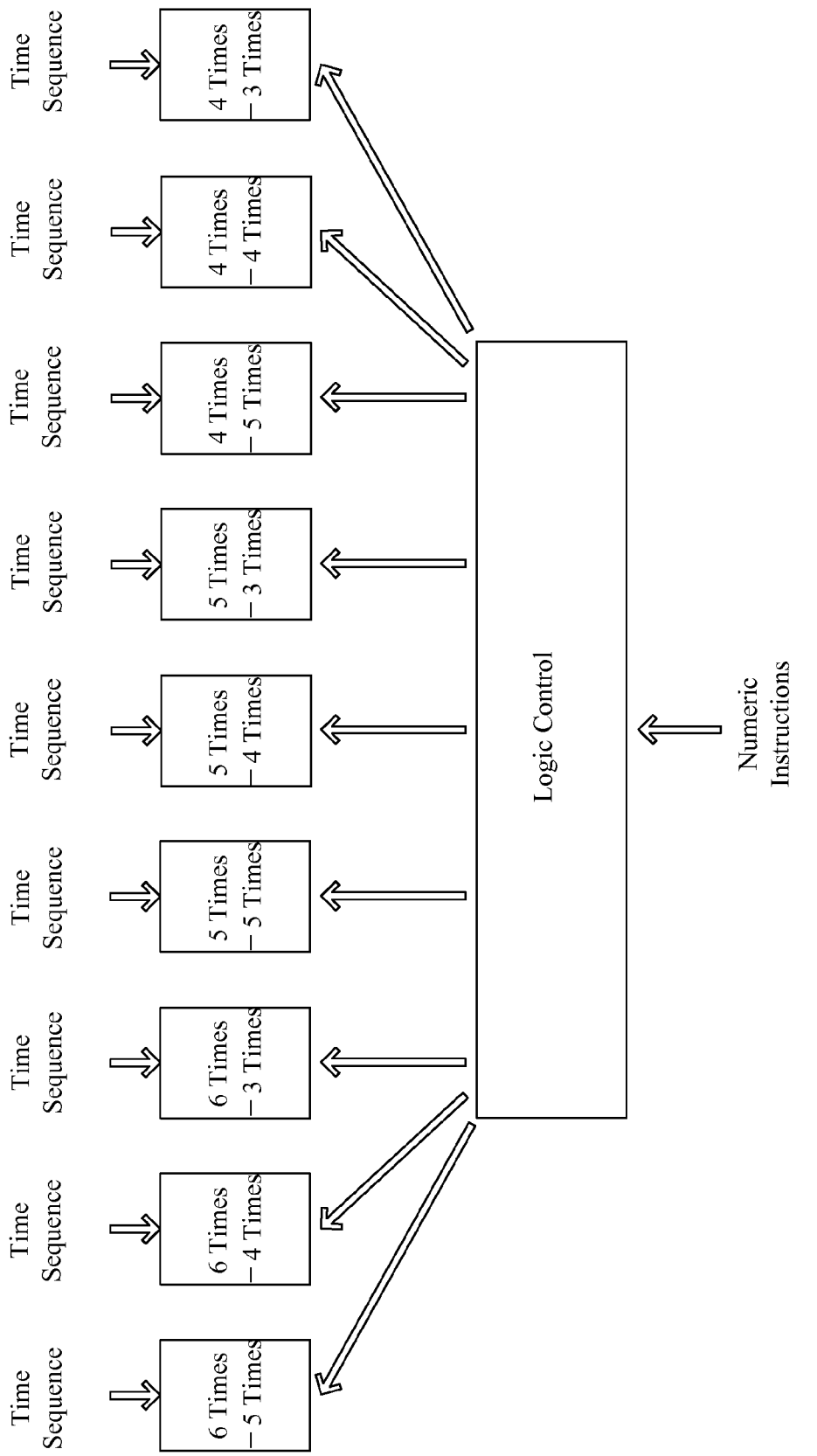
FIG. 11 illustrates, through the numeric logic of FIG. 10, the realization conceptual diagram illustrating control by using the control time-sequence for the electronic switches of the second stage charge pump.

As illustrated in FIG. 11, through numeric logic to control the time sequence for controlling the electronic switches of the charge pumps, the following can be generated: VPx=6VDD and VNx=−5VDD, VPx=6VDD and VNx=−4VDD, VPx=6VDD and VNx=−3VDD, VPx=5VDD and VNx=−5VDD, VPx=5VDD and VNx=−4VDD, VPx=5VDD and VNx=−3VDD, VPx=4VDD and VNx=−5VDD, VPx=4VDD and VNx=−4VDD, and VPx=4VDD and VNx=−3VDD etc. There are 9 different types of positive and negative high voltage output conditions.

Figure 12:
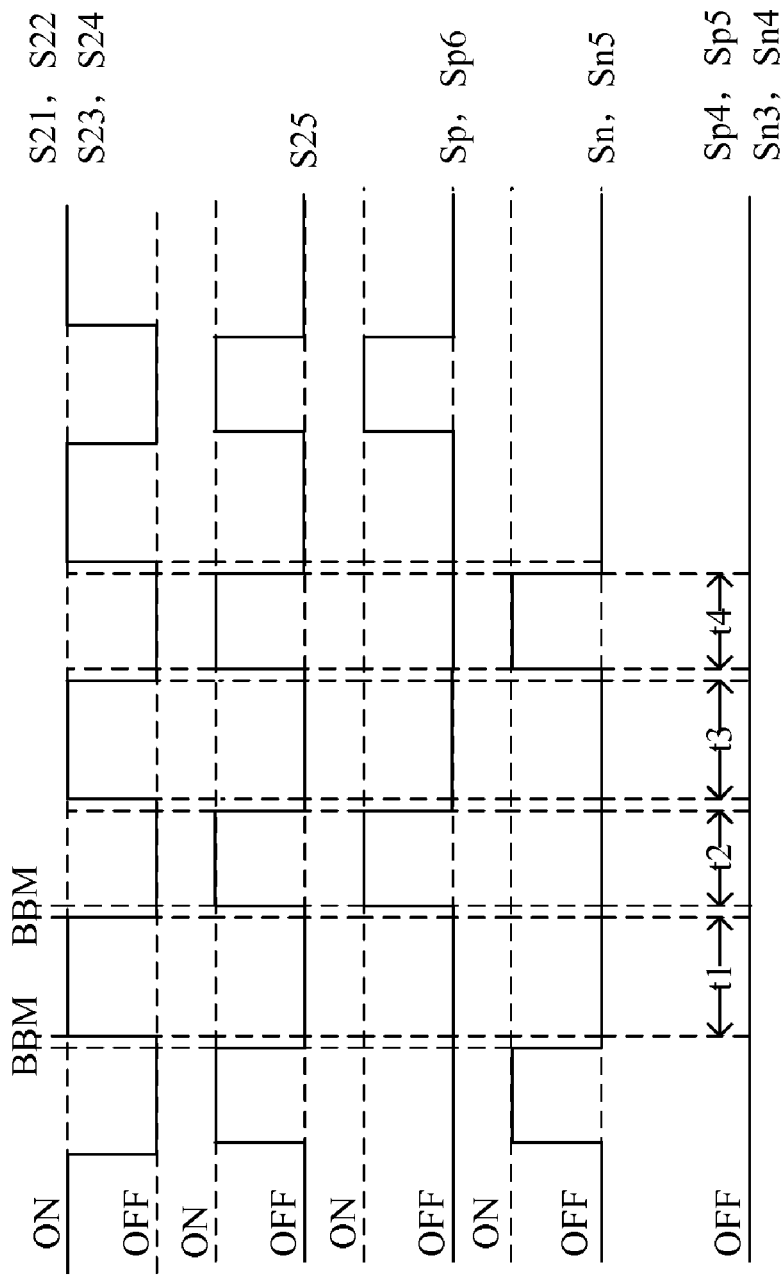
FIG. 12 is the control time sequence diagram for the electronic switches of the second stage charge pump illustrated in FIG. 10 when the positive and negative output voltages are 6 times and −5 times, respectively.

When positive and negative high voltage outputs are 6 times and −5 times, the time sequence for controlling the electronic switches of the charge pump is illustrated by FIG. 12. In the process of charging and discharging, electronic switches Sp4, Sp5, Sn3 and Sn4 are in the disconnected state.

During time t1, electronic switches S21, S22, S23, and S24 are conductive, and electronic switches S23, Sp, Sp6, Sn, and Sn5 are not conductive; the C2A terminal of capacitor C2 through electronic switch S2 connects with voltage Vp2, and the C2B terminal through electronic switch S23 connects with zero voltage VSS; through the path from voltage VP2 through coupling capacitor C2 to zero voltage VSS, VP2 charges capacitor C2 and forms the voltage potential VP2 across the two terminals of capacitor C2. At the same time, the C3A terminal of capacitor C3 through electronic switch S22 and connects with voltage Vp2, and the C3B terminal through electronic switch S24 and connects with zero voltage VSS; through the path from voltage VP2 through coupling capacitor C3 to zero voltage VSS, VP2 charges capacitor C3, and forms the voltage potential VP2 across the two terminals of capacitor C3.

During time t2, electronic switches S21, S22, S23, S24, Sn and Sn5 are disconnected, and electronic switches S25, Sp, and Sp6 are conductive; the C3B terminal of capacitor C3 through electronic switch Sp6 connects with voltage Vp2, and the C3A terminal through electronic switch S25 connects with the C2B terminal of capacitor C2, and the C2A terminal of capacitor C2 through electronic switch Sp, and connects to output terminal VPx; through the path from voltage VP2 through electronic switch Sp6, capacitor C3, electronic switch S25, capacitor C2, electronic switch Sp, output terminal VPx, and output capacitor C7 to zero voltage VSS, the output voltage at output terminal VPx is the input voltage VP2 plus the voltage VP2 stored in capacitor C2 during t1 and voltage VP2 stored in capacitor C3 to realize the 6 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage Vp2, and the C3B terminal through electronic switch S24 connects with zero voltage VSS; through the path from voltage VP2 through coupling capacitor C3 to zero voltage VSS, VP2 charges capacitor C3 and forms the voltage potential VP2 across the two terminals of capacitor C3.

During time t4, electronic switches S21, S22, S23, S24, Sp and Sp6 are disconnected, and electronic switches S25, Sn, and Sn5 are conductive; the C2A terminal of capacitor C2 through electronic switch Sn5 connects to the output terminal VN1 of the first stage charge pump, and the C2B terminal through electronic switch S25 connects to the C3A terminal of capacitor C3, and the C3B terminal of capacitor C3 through electronic switch Sn connects to output terminal VNx; through the path from input voltage VN1 through electronic switch Sn5, capacitor C2, electronic switch S25, capacitor C3, electronic switch Sn, output terminal VNx, and output capacitor C5 to zero voltage VSS, the output voltage at output terminal VNx is the input voltage VN1 minus the voltage VP2 stored in capacitor C2 during time t3 and voltage VP2 stored in capacitor C3 to realize the −5 times VDD negative high voltage boost. If the power consumption of the electronic switches and capacitors are not considered, after repeatedly charging and discharging, high positive ouput voltage VPx=VP2+VP2+VP2=6VDD, and negative high output voltage VNx=VN1−VP2−VP2=−5VDD can be obtained.

Figure 13:
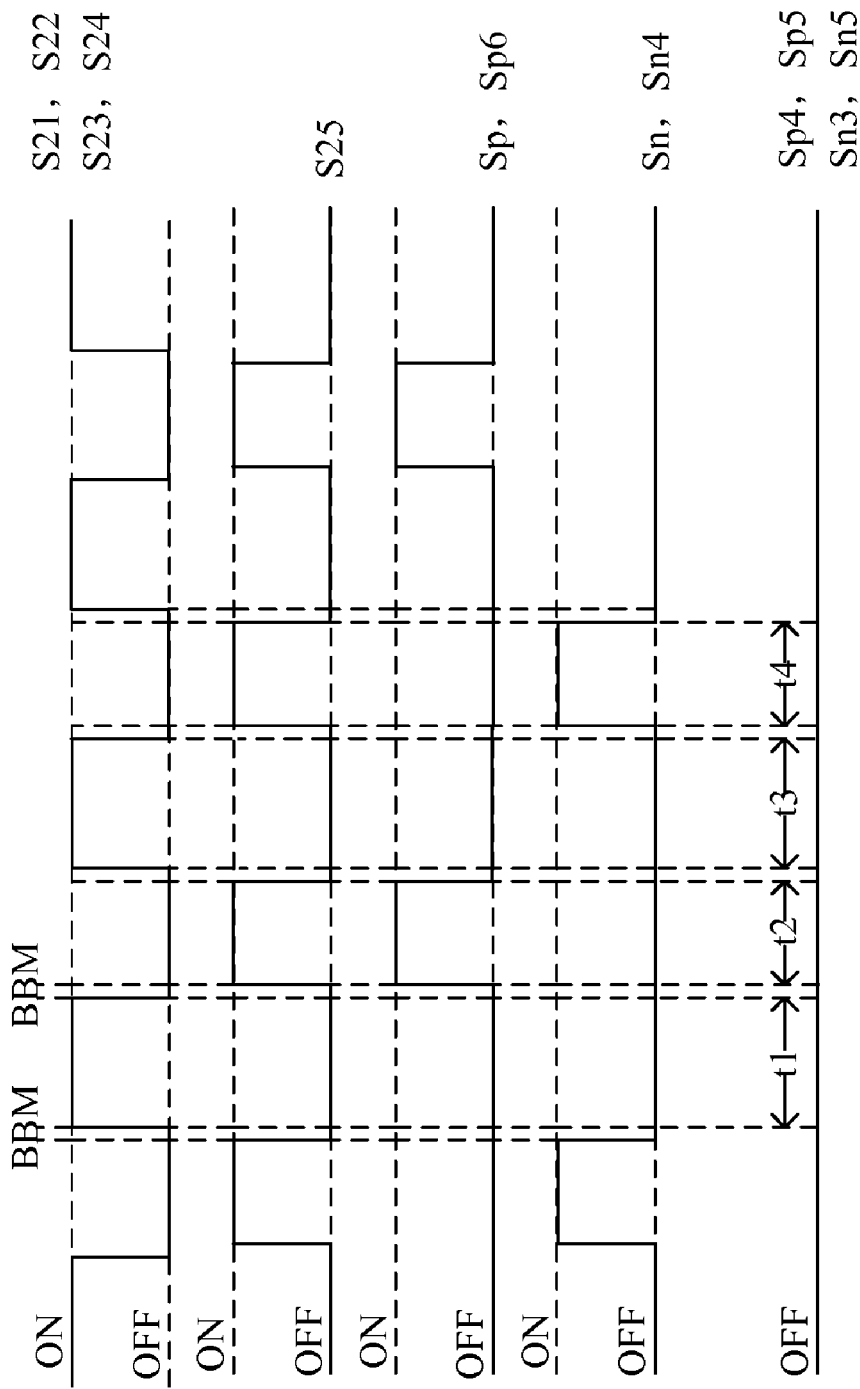
FIG. 13 is the control time sequence diagram for the electronic switches of the second stage charge pump illustrated in FIG. 10 when the positive and negative output voltages are 6 times and −4 times, respectively.

When positive and negative high voltage outputs are 6 times and −4 times, the time sequence for controlling the electronic switches of the charge pump is illustrated by FIG. 13. In the process of charging and discharging, electronic switches Sp4, Sp5, Sn3 and Sn5 are in the disconnected state.

During time t1, electronic switches S21, S22, S23, and S24 are conductive, and electronic switches S25, Sp, Sp6, Sn, and Sn4 are not conductive; the C2A terminal of capacitor C2 through electronic switch S21 connects with voltage Vp2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage Vp2, and the C3B terminal through electronic switch S24 connects with zero voltage VSS; through the path where voltage VP2 through coupling capacitor C3 to zero voltage VSS, VP2 charges capacitor C3 and forms the voltage potential VP2 across the two terminals of capacitor C3.

During time t2, electronic switches S21, S22, S23, S24, Sn and Sn4 are disconnected, and electronic switches S25, Sp, and Sp6, are conductive; the C3B terminal of capacitor C3 through electronic switch Sp6 connects with voltage Vp2, and the C3A terminal through electronic switch S25 connects with the C2B terminal of capacitor C2, and the C2A terminal of capacitor C2 through electronic switch Sp connects to output terminal VPx; through the path from voltage VP2 through electronic switch Sp6, capacitor C3, electronic switch S25, capacitor C2, electronic switch Sp, output terminal VPx, and output capacitor C7 to zero voltage VSS, the output voltage at output terminal VPx is the input voltage VP2 plus the voltage VP2 stored in capacitor C2 during time t1 and voltage VP2 stored in capacitor C3 to realize the 6 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp6 are disconnected, and electronic switches S25, Sn, and Sn4 are conductive; the C2A terminal of capacitor C2 through electronic switch Sn4 connects to the zero voltage potential VSS, and the C2B terminal through electronic switch S25 connects to the C3A terminal of capacitor C3, and the C3B terminal of capacitor C3 through electronic switch Sn connects to output terminal VNx; through the path from zero voltage VSS through electronic switch Sn4, capacitor C2, electronic switch S25, capacitor C3, electronic switch Sn, output terminal VNx, and output capacitor C5 to zero voltage VSS, the output voltage at output terminal VNx is the zero voltage VSS minus the voltage VP2 stored in capacitor C2 during time t3 and voltage VP2 stored in capacitor C3 to realize the −4 times VDD negative high voltage boost. If the power consumption of the electronic switches and capacitors are not considered, after repeatedly charging and discharging, high positive ouput voltage VPx=VP2+VP2+VP2=6VDD, and negative high output voltage VNx=VSS−VP2−VP2=−4VDD can be obtained.

Figure 14:
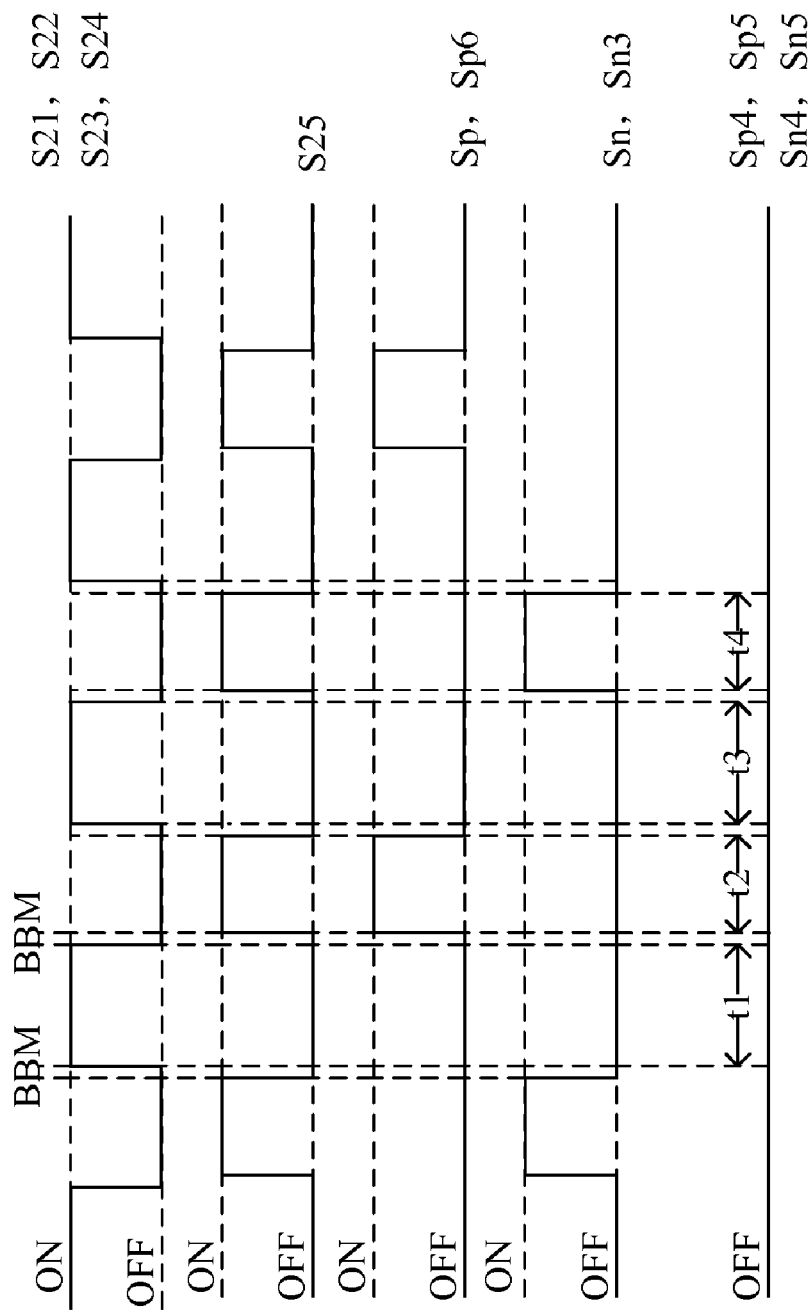
FIG. 14 is the control time sequence diagram for the electronic switches of the second stage charge pump illustrated in FIG. 10 when the positive and negative output voltages are 6 times and −3 times, respectively.

When positive and negative high voltage outputs are 6 times and −3 times, the time sequence for controlling the electronic switches of the second stage charge pump is illustrated by FIG. 14. In the process of charging and discharging, electronic switches Sp4, Sp5, Sn4 and Sn5 are in the disconnected state.

When positive and negative high voltage outputs are 6 times and −3 times, the time sequence for controlling the electronic switches of the second stage charge pump is illustrated by FIG. 14. In the process of charging and discharging, electronic switches Sp4, Sp5, Sn4 and Sn5 are in the disconnected state.

During time t1, electronic switches S21, S22, S23, and S24 are conductive, and electronic switches S25, Sp, Sp6, Sn, and Sn3 are not conductive; the C2A terminal of capacitor C2 through electronic switch S21 connects with voltage Vp2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage Vp2, and the C3B terminal through electronic switch S24 connects with zero voltage VSS; through the path from voltage VP2 through coupling capacitor C3 to zero voltage VSS, VP2 charges capacitor C3 and forms the voltage potential VP2 across the two terminals of capacitor C3.

During time t2, electronic switches S21, S22, S23, S24, Sn and Sn3 are disconnected, and electronic switches S25, Sp, and Sp6, are conductive; the C3B terminal of capacitor C3 through electronic switch Sp6 connects with voltage Vp2, and the C3A terminal through electronic switch S25 connects with the C2B terminal of capacitor C2, and the C2A terminal of capacitor C2 through electronic switch Sp connects to output terminal VPx; through the path from voltage VP2 through electronic switch Sp6, capacitor C3, electronic switch S25, capacitor C2, electronic switch Sp, output terminal VPx, and output capacitor C7 to zero voltage VSS, the output voltage at output terminal VPx is voltage VP2 plus the voltage VP2 stored in capacitor C2 during time t1 and voltage VP2 stored in capacitor C3 to realize the 6 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp6 are disconnected, and electronic switches S25, Sn, and Sn3 are conductive; the C2A terminal of capacitor C2 through electronic switch Sn3 connects to the input voltage VDD, and the C2B terminal through electronic switch S25 connects to the C3A terminal of capacitor C3, and the C3B terminal of capacitor C3 through electronic switch Sn connects to output terminal VNx; through the path from voltage VDD through electronic switch Sn3, capacitor C2, electronic switch S25, capacitor C3, electronic switch Sn, output terminal VNx, and output capacitor C5 to zero voltage VSS, the output voltage at output terminal VNx is voltage VDD minus the voltage VP2 stored in capacitor C2 during time t3 and voltage VP2 stored in capacitor C3 to realize the −3 times VDD negative high voltage boost. If the power consumption of the electronic switches and capacitors are not considered, after repeatedly charging and discharging, high positive ouput voltage VPx=VP2+VP2+VP2=6VDD, and negative high output voltage VNx=VDD−VP2−VP2=−3VDD can be obtained.

Figure 15:
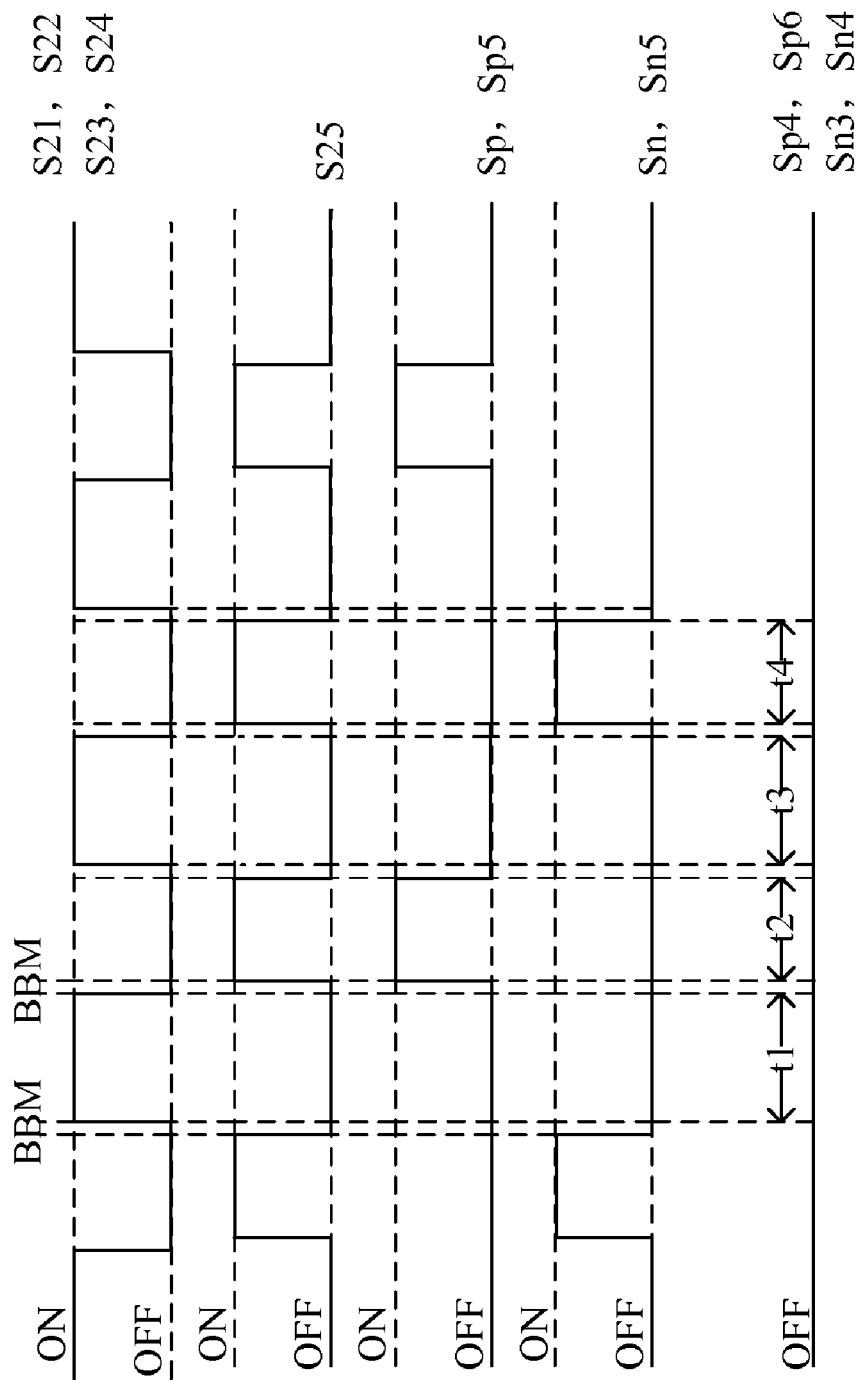
FIG. 15 is the control time sequence diagram for the electronic switches of the second stage charge pump illustrated in FIG. 10 when the positive and negative output voltages are 5 times and −5 times, respectively.

When positive and negative high voltage outputs are 5 times and −5 times, the time sequence for controlling the electronic switches of the charge pump is illustrated in FIG. 15. In the process of charging and discharging, electronic switches Sp4, Sp6, Sn3 and Sn4 are in the disconnected state.

During time t1, electronic switches S21, S22, S23, and S24 are conductive, and electronic switches S25, Sp, Sp5, Sn, and Sn5 are not conductive; the C2A terminal of capacitor C2 through electronic switch S21 connects with voltage Vp2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage Vp2, and the C3B terminal through electronic switch S24 connects with zero voltage VSS; through the path from voltage VP2 through coupling capacitor C3 to zero voltage VSS, VP2 charges capacitor C3 and forms the voltage potential VP2 across the two terminals of capacitor C3.

During time t2, electronic switches S21, S22, S23, S24, Sn and Sn5 are disconnected, and electronic switches S25, Sp, and Sp5, are conductive; the C3B terminal of capacitor C3 through electronic switch Sp5 connects with voltage VDD, and the C3A terminal through electronic switch S25 connects with the C2B terminal of capacitor C2, and the C2A terminal of capacitor C2 through electronic switch Sp connects to output terminal VPx; through the path from voltage VDD through electronic switch Sp5, capacitor C3, electronic switch S25, capacitor C2, electronic switch Sp, output terminal VPx, and output capacitor C7 to zero voltage VSS, the output voltage at output terminal VPx is input voltage VDD plus the voltage VP2 stored in capacitor C2 and voltage VP2 stored in capacitor C3 during time t1, to realize the 5 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp5 are disconnected, and electronic switches S25, Sn, and Sn5 are conductive; the C2A terminal of capacitor C2 connects to the output voltage VN1 at the output terminal of the first stage charge pump, and the C2B terminal through electronic switch S25 connects to the C3A terminal of capacitor C3, and the C3B terminal of capacitor C3 through electronic switch Sn connects to output terminal VNx; through the path from voltage VN1 through electronic switch Sn5, capacitor C2, electronic switch S25, capacitor C3, electronic switch Sn, output terminal VNx, and output capacitor C5 to zero voltage VSS, the output voltage at output terminal VNx is voltage VN1 minus the voltage VP2 stored in capacitor C2 and voltage VP2 stored in capacitor C3 during time t3 to realize the −5 times VDD negative high voltage boost. If the power consumption of the electronic switches and capacitors are not considered, after repeatedly charging and discharging, high positive ouput voltage VPx=VDD+VP2+VP2=5VDD, and negative high output voltage VNx=VN1−VP2−VP2=−5VDD can be obtained.

Figure 16:
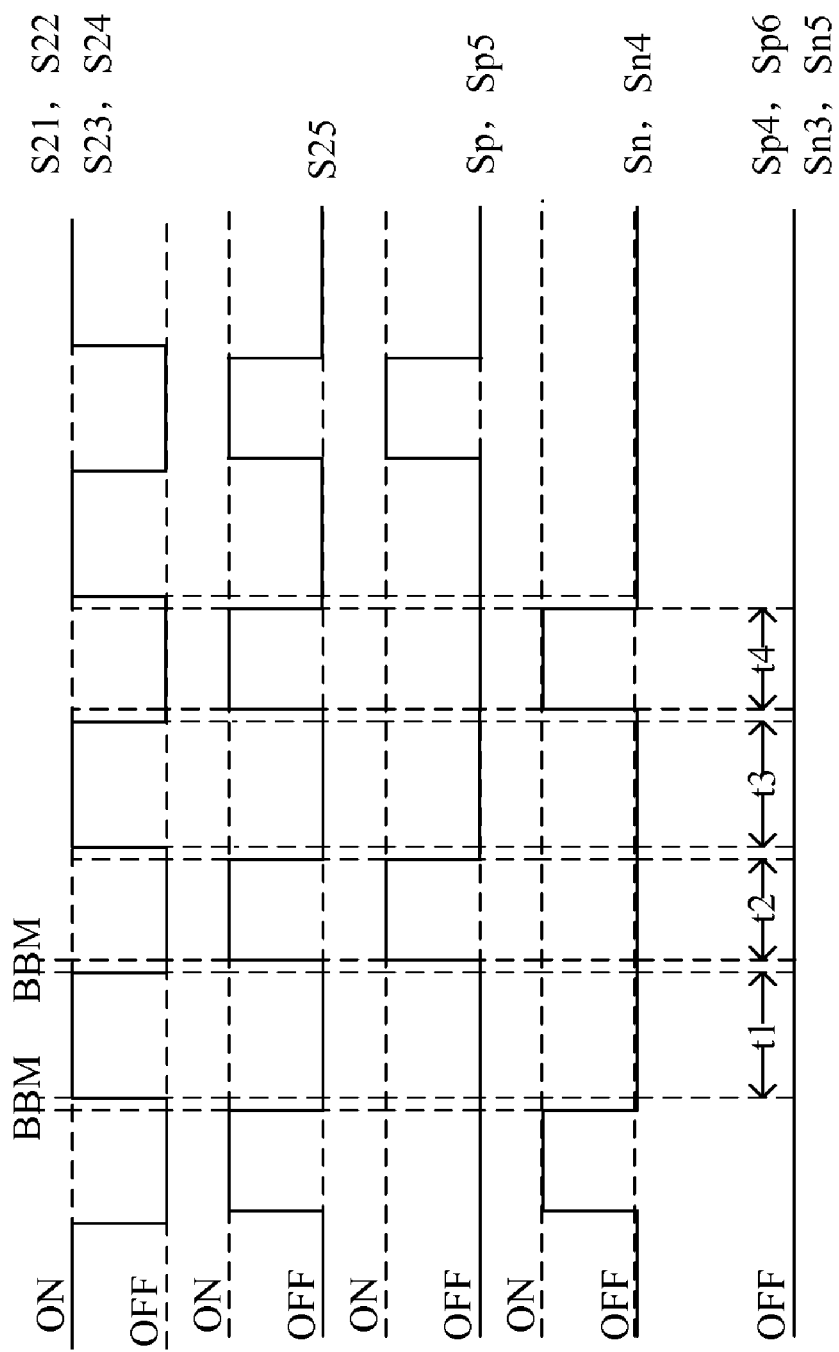
FIG. 16 is the control time sequence diagram for the electronic switches of the second stage charge pump illustrated in FIG. 10 when the positive and negative output voltages are 5 times and −4 times, respectively.

When positive and negative high voltage outputs are 5 times and −4 times, the time sequence for controlling the electronic switches of the second stage charge pump is illustrated in FIG. 16. In the process of charging and discharging, electronic switches Sp4, Sp6, Sn3 and Sn5 are in the disconnected state.

During time t1, electronic switches S21, S22, S23, and S24 are conductive, and electronic switches S25, Sp, Sp5, Sn, and Sn5 are not conductive; the C2A terminal of capacitor C2 through electronic switch S21 connects with voltage Vp2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage Vp2, and the C3B terminal through electronic switch S24 connects with zero voltage VSS; through the path from voltage VP2 through capacitor C3 to zero voltage VSS, VP2 charges capacitor C3 and forms the voltage potential VP2 across the two terminals of capacitor C3.

During time t2, electronic switches S21, S22, S23, S24, Sn and Sn4 are disconnected, and electronic switches S25, Sp, and Sp5, are conductive; the C3B terminal of capacitor C3 through electronic switch Sp5 connects with voltage VDD, the C3A terminal through electronic switch S25 connects with the C2B terminal of capacitor C2, and the C2A terminal of capacitor C2 connects to output terminal VPx; through the path from voltage VDD through electronic switch Sp5, capacitor C3, electronic switch S25, capacitor C2, electronic switch Sp, output terminal VPx, and output capacitor C7 to zero voltage VSS, the output voltage at output terminal VPx is voltage VDD plus the voltage VP2 stored in capacitor C2 and voltage VP2 stored in capacitor C3 during time t1 to realize the 5 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp5 are disconnected, and electronic switches S25, Sn, and Sn4 are conductive; the C2A terminal of capacitor C2 connects through electronic switch S21 to zero voltage VSS, the C2B terminal through electronic switch S25 connects to the C3A terminal of capacitor C3, and the C3B terminal of capacitor C3 through electronic switch Sn connects to output terminal VNx; through the path from zero voltage VSS through electronic switch Sn4, capacitor C2, electronic switch S25, capacitor C3, electronic switch Sn, output terminal VNx, and output capacitor C5 to zero voltage VSS, the output voltage at output terminal VNx is voltage VSS minus the voltage VP2 stored in capacitor C2 and voltage VP2 stored in capacitor C3 during time t3 to realize the −4 times VDD negative high voltage boost. If the power consumption of the electronic switches and capacitors are not considered, after repeatedly charging and discharging, high positive ouput voltage VPx=VDD+VP2+VP2=5VDD, and negative high output voltage VNx=VSS−VP2−VP2=−4VDD can be obtained.

Figure 17:
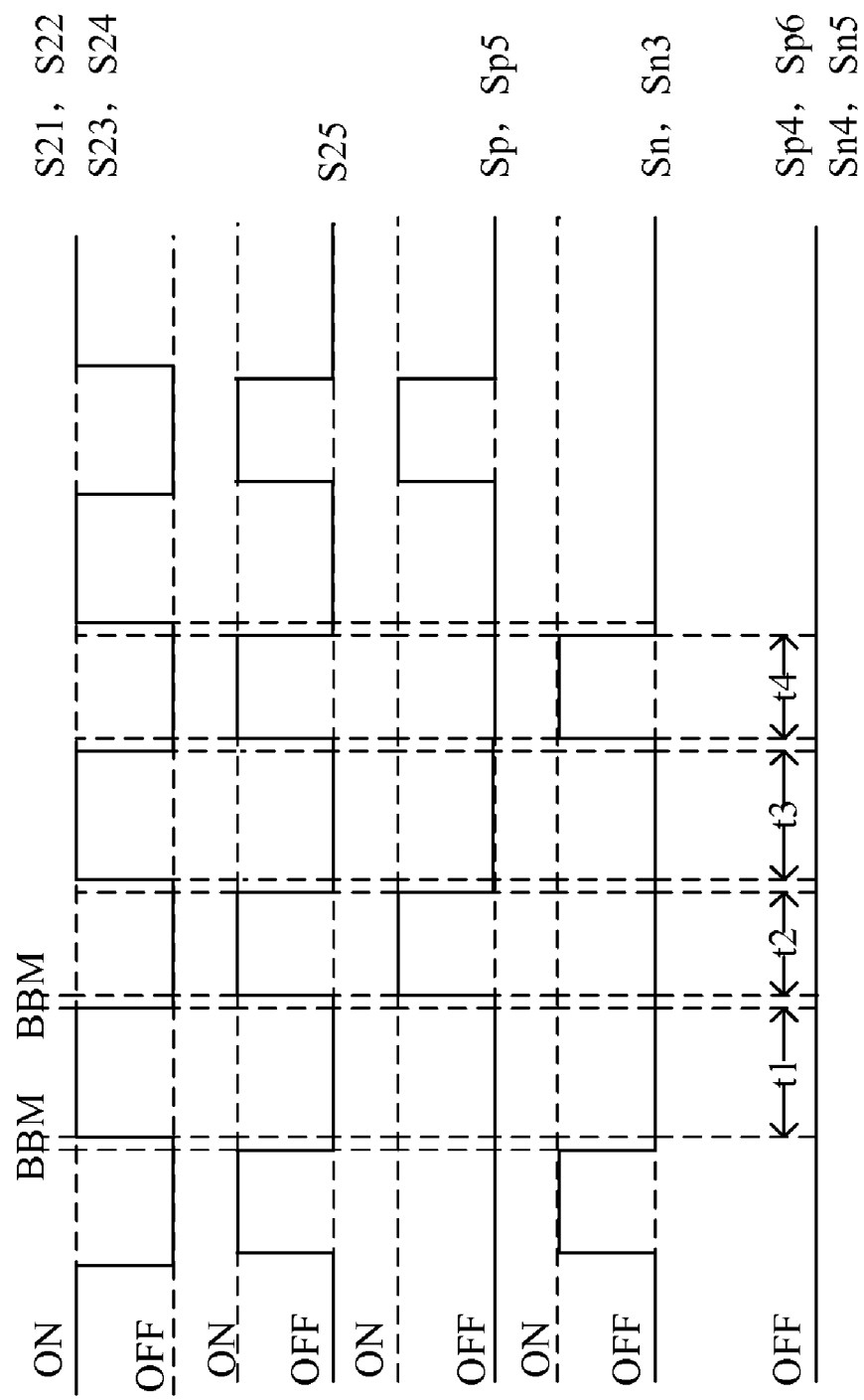
FIG. 17 is the control time sequence diagram for the electronic switches of the second stage charge pump illustrated in FIG. 10 when the positive and negative output voltages are respectively 5 times and −3 times.

When positive and negative high voltage outputs are 5 times and −3 times, the time sequence for controlling the electronic switches of the charge pump is illustrated in FIG. 17. In the process of charging and discharging, electronic switches Sp4, Sp6, Sn4 and Sn5 are in the disconnected state.

During t1, electronic switches S21, S22, S23, and S24 are conductive, and electronic switches S25, Sp, Sp5, Sn, and Sn3 are not conductive; the C2A terminal of capacitor C2 through electronic switch S21 connects with voltage VP2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S22 connects with voltage VP2, and the C3B terminal through electronic switch S24 connects with zero voltage VSS; through the path from voltage VP2 through capacitor C3 to zero voltage VSS, VP2 charges capacitor C3 and forms the voltage potential VP2 across the two terminals of capacitor C3.

During time t2, electronic switches S21, S22, S23, S24, Sn and Sn3 are disconnected, and electronic switches S25, Sp, and Sp5 are conductive; the C3B terminal of capacitor C3 through electronic switch Sp5 connects with voltage VDD, the C3A terminal through electronic switch S25 connects with the C2B terminal of capacitor C2, and the C2A terminal of capacitor C2 connects through electronic switch Sp to output terminal VPx; through the path from voltage VDD through electronic switch Sp5, capacitor C3, electronic switch S25, capacitor C2, electronic switch Sp, output terminal VPx, and output capacitor C7 to zero voltage VSS, the output voltage at output terminal VPx is voltage VDD plus the voltage VP2 stored in capacitor C2 and voltage VP2 stored in capacitor C3 during time t1 to realize the 5 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp5 are disconnected, and electronic switches S25, Sn, and Sn3 are conductive; the C2B terminal of capacitor C2 connects through electronic switch S25 to the C3A terminal of capacitor C3, and the C3B terminal of capacitor C3 connects to output terminal VNx; through the path from voltage VDD through electronic switch Sn3, capacitor C2, electronic switch S25, capacitor C3, electronic switch Sn, output terminal VNx, and output capacitor C5 to zero voltage VSS, the output voltage at output terminal VNx is voltage VDD minus the voltage VP2 stored in capacitor C2 and voltage VP2 stored in capacitor C3 during time t3 to realize the −3 times VDD negative high voltage boost. If the power consumption of the electronic switches and capacitors is not considered, after repeatedly charging and discharging, high positive ouput voltage VPx=VDD+VP2+VP2=5VDD, and negative high output voltage VNx=VDD−VP2−VP2=−3VDD can be obtained.

Figure 18:
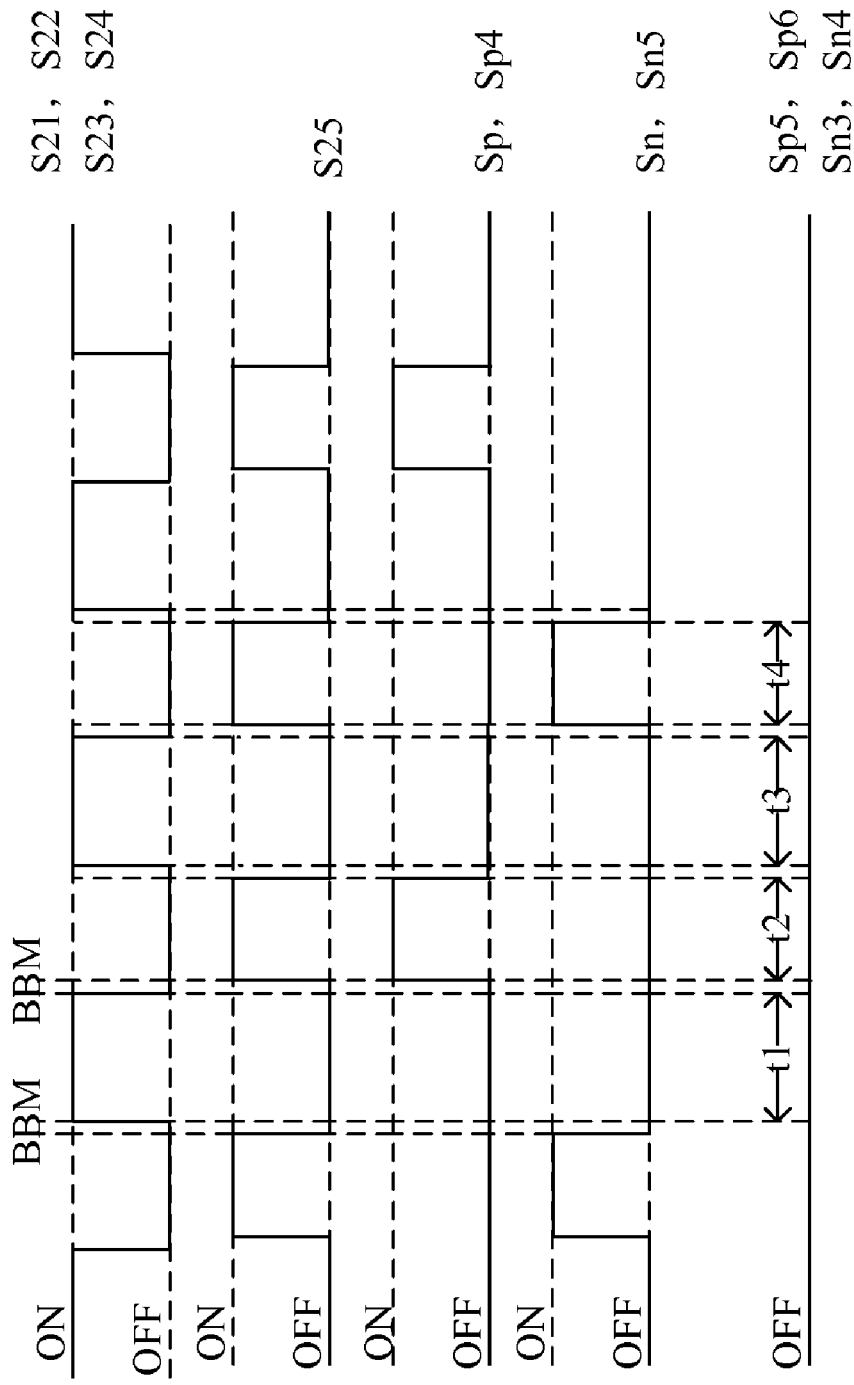
FIG. 18 is the control time sequence diagram for the electronic switches of the second stage charge pump illustrated in FIG. 10 when the positive and negative output voltages are respectively 4 times and −5 times.

When positive and negative high voltage outputs are 4 times and −5 times, the time sequence for controlling the electronic switches of the second stage charge pump is illustrated in FIG. 18. In the process of charging and discharging, electronic switches Sp5, Sp6, Sn3 and Sn4 are in the disconnected state.

During time t1, electronic switches S21, S22, S23, and S24 are conductive, and electronic switches S25, Sp, Sp4, Sn, and Sn5 are not conductive; the C2A terminal of capacitor C2 through electronic switch S21 connects with voltage VP2, and the C2B terminal through electronic switch S23 connects with zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to voltage VP2, and the C3B terminal through electronic switch S24 connects with zero voltage VSS; through the path from voltage VP2 through capacitor C3 to zero voltage VSS, VP2 charges capacitor C3 and forms the voltage potential VP2 across the two terminals of capacitor C3.

During time t2, electronic switches S21, S22, S23, S24, Sn and Sn5 are disconnected, and electronic switches S25, Sp, and Sp4 are conductive; the C3B terminal of capacitor C3 through electronic switch Sp4 connects with zero voltage VSS, the C3A terminal through electronic switch S25 connects with the C2B terminal of capacitor C2, and the C2A terminal of capacitor C2 connects through electronic switch Sp to output terminal VPx; through the path from voltage VSS through electronic switch Sp4, capacitor C3, electronic switch S25, capacitor C2, electronic switch Sp, output terminal VPx, and output capacitor C7 to zero voltage VSS, the output voltage at output terminal VPx is zero voltage VSS plus the voltage VP2 stored in capacitor C2 and voltage VP2 stored in capacitor C3 during time t1 to realize the 4 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp4 are disconnected, and electronic switches S25, Sn, and Sn5 are conductive; the C2A terminal of capacitor C2 connects through electronic switch Sn5 to the output voltage VN1 at the output terminal of the first stage charge pump, the C2B terminal through electronic switch S25 connects to the C3A terminal of capacitor C3, and the C3B terminal of capacitor C3 through electronic switch Sn connects to output terminal VNx; through the path from voltage VN1 through electronic switch Sn5, capacitor C2, electronic switch S25, capacitor C3, electronic switch Sn, output terminal VNx, and negative high output voltage VNx=VN1−VP2−VP2=−5VDD can be obtained negative high output voltage VNx=VN1−VP2−VP2=−5VDD can be obtained.

Figure 19:
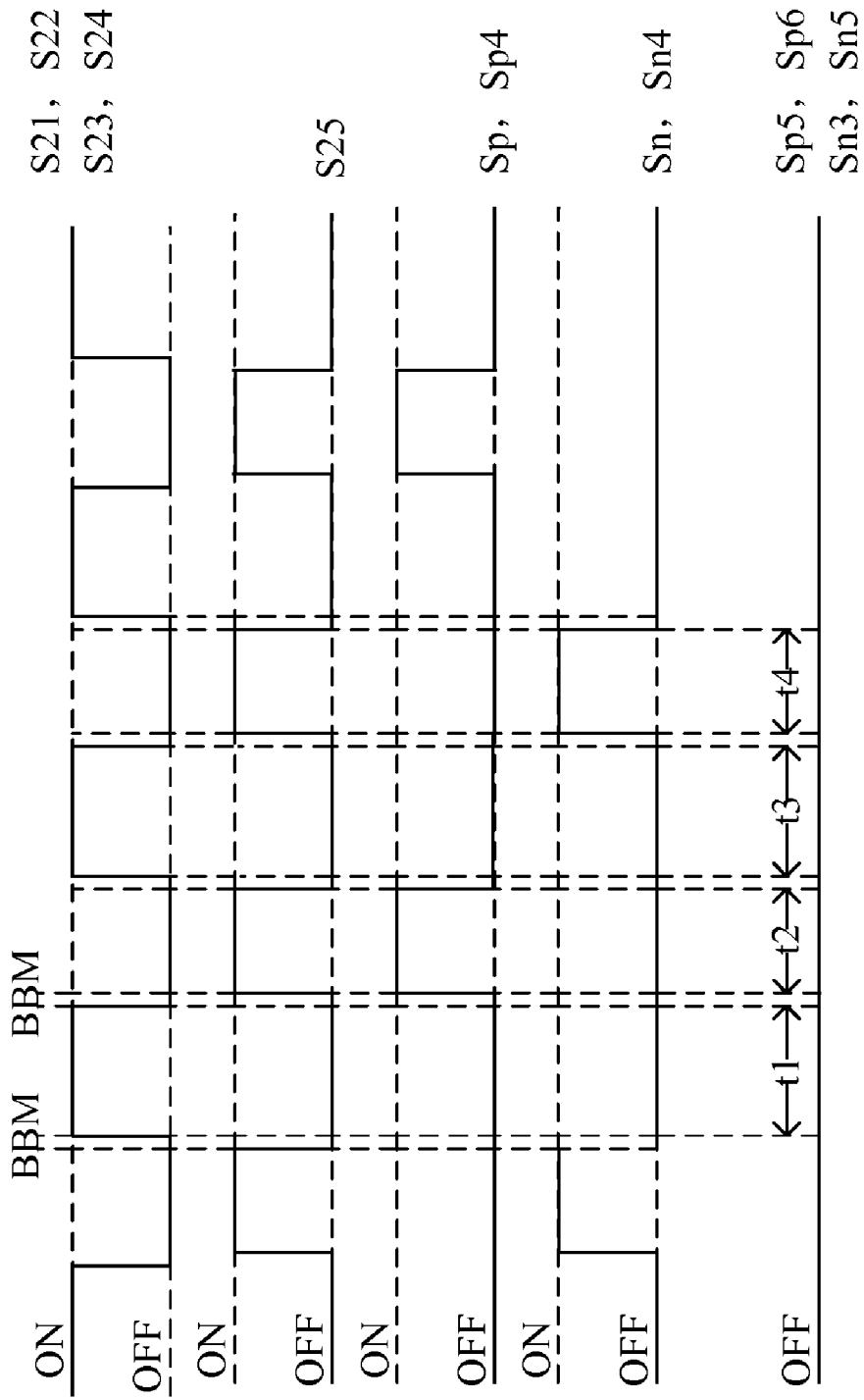
FIG. 19 is the control time sequence diagram for the electronic switches of the second stage charge pump illustrated in FIG. 10 when the positive and negative output voltages are respectively 4 times and −4 times.
Figure 20:
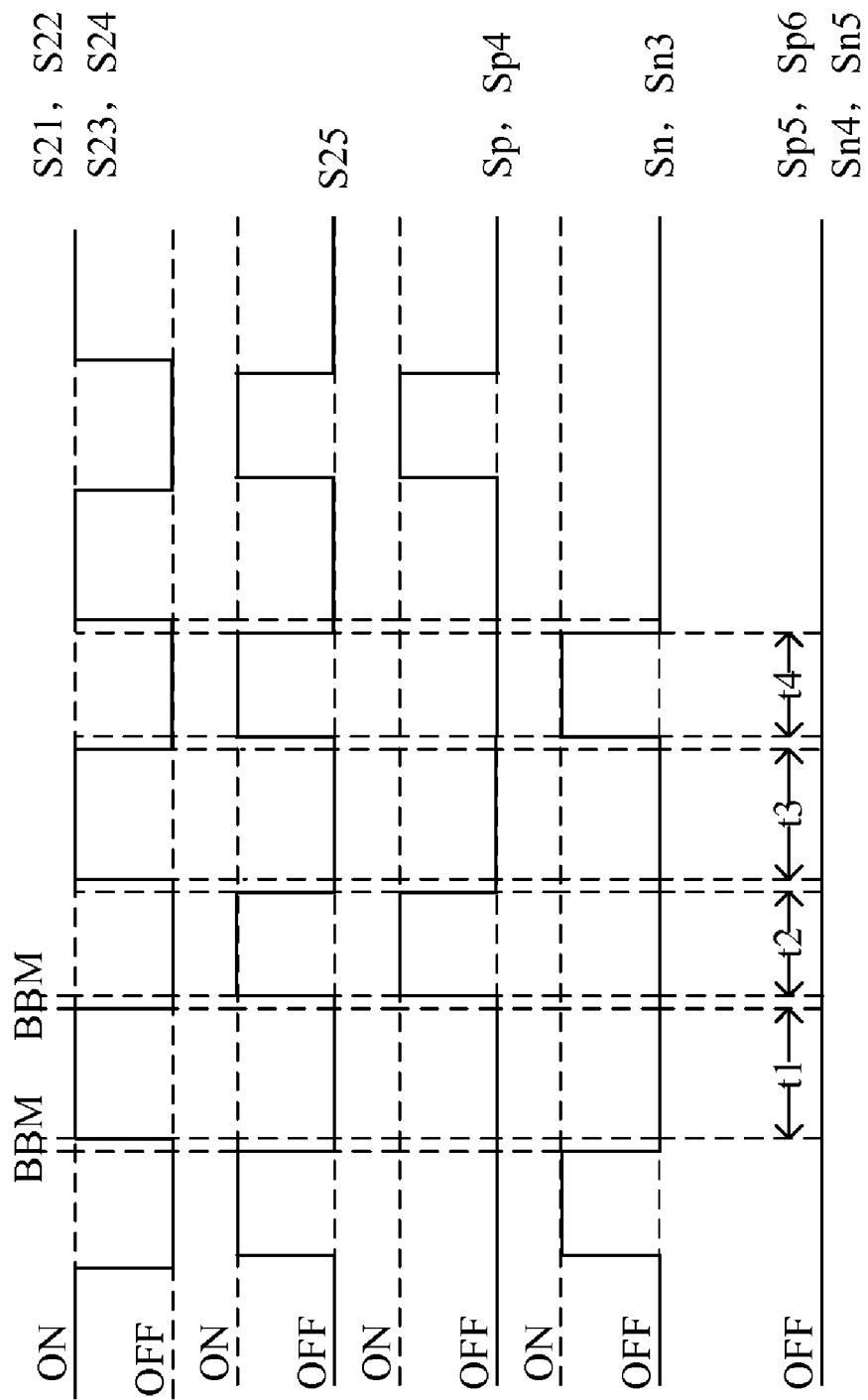
FIG. 20 is the control time sequence diagram for the electronic switches of the second stage charge pump illustrated in FIG. 10 when the positive and negative output voltages are 4 times and −3 times, respectively.

When positive and negative high voltage outputs are 4 times and −4 times, the time sequence for controlling the electronic switches of the charge pump is illustrated in FIG. 19. In the process of charging and discharging, negative high output voltage VNx=VN1−VP2−VP2=−5VDD can be obtained.

When positive and negative high voltage outputs are 4 times and −4 times, the time sequence for controlling the electronic switches of the charge pump is illustrated in FIG. 19. In the process of charging and discharging, electronic switches Sp5, Sp6, Sn3 and Sn5 are in the disconnected state.

During time t1, electronic switches S21, S22, S23, and S24 are conductive, and electronic switches S25, Sp, Sp4, Sn, and Sn4 are not conductive; the C2A terminal of capacitor C2 connects to voltage VP2, and the C2B terminal connects to zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S21 connects to voltage VP2, and the C3B terminal through electronic switch S23 connects with zero voltage VSS; through the path from voltage VP2 through capacitor C3 to zero voltage VSS, VP2 charges capacitor C3 and forms the voltage potential VP2 across the two terminals of capacitor C3.

During time t2, electronic switches S21, S22, S23, S24, Sn and Sn4 are disconnected, and electronic switches S25, Sp, and Sp4 are conductive; the C3B terminal of capacitor C3 through electronic switch Sp4 connects with zero voltage VSS, the C3A terminal through electronic switch S25 connects with the C2B terminal of capacitor C2, and the C2A terminal of capacitor C2 connects through electronic switch Sp to output terminal VPx; through the path from voltage VSS through electronic switch Sp4, capacitor C3, electronic switch S25, capacitor C2, electronic switch Sp, output terminal VPx, and output capacitor C7 to zero voltage VSS, the output voltage at output terminal VPx is zero voltage VSS plus the voltage VP2 stored in capacitor C2 and voltage VP2 stored in capacitor C3 during time t1 to realize the 4 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp4 are disconnected, and electronic switches S25, Sn, and Sn4 are conductive; the C2A terminal of capacitor C2 connects through electronic switch Sn4 to zero voltage VSS, the C2B terminal through electronic switch S25 connects to the C3A terminal of capacitor C3, and the C3B terminal of capacitor C3 through electronic switch Sn connects to output terminal VNx; through the path from zero voltage VSS through electronic switch Sn4, capacitor C2, electronic switch S25, capacitor C3, electronic switch Sn, output terminal VNx, and output capacitor C5 to zero voltage VSS, the output voltage at output terminal VNx is voltage VSS minus the voltage VP2 stored in capacitor C2 and voltage VP2 stored in capacitor C3 during time t3 to realize the −4 times VDD negative high voltage boost. If the power consumption of the electronic switches and capacitors are not considered, after repeatedly charging and discharging, high positive ouput voltage VPx=VSS+VP2+VP2=4VDD, and negative high output voltage VNx=VSS−VP2−VP2=−4VDD can be obtained.

When positive and negative high voltage outputs are 4 times and −3 times, the time sequence for controlling the electronic switches of the second stage charge pump is illustrated in FIG. 14. In the process of charging and discharging, electronic switches Sp5, Sp6, Sn4 and Sn5 are in the disconnected state.

During time t1, electronic switches S21, S22, S23, and S24 are conductive, and electronic switches S25, Sp, Sp4, Sn, and Sn3 are not conductive; the C2A terminal of capacitor C2 connects to voltage VP2, and the C2B terminal connects to zero voltage VSS; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 through electronic switch S21 connects to voltage VP2, and the C3B terminal through electronic switch S23 connects with zero voltage VSS; through the path from voltage VP2 through capacitor C3 to zero voltage VSS, VP2 charges capacitor C3 and forms the voltage potential VP2 across the two terminals of capacitor C3.

During time t2, electronic switches S21, S22, S23, S24, Sn and Sn3 are disconnected, and electronic switches S25, Sp, and Sp4 are conductive; the C3B terminal of capacitor C3 through electronic switch Sp4 connects with zero voltage VSS, the C3A terminal through electronic switch S25 connects with the C2B terminal of capacitor C2, and the C2A terminal of capacitor C2 connects through electronic switch Sp to output terminal VPx; through the path from voltage VSS through electronic switch Sp4, capacitor C3, electronic switch S25, capacitor C2, electronic switch Sp, output terminal VPx, and output capacitor C7 to zero voltage VSS, the output voltage at output terminal VPx is zero voltage VSS plus the voltage VP2 stored in capacitor C2 and voltage VP2 stored in capacitor C3 during time t1 to realize the 4 times VDD positive high voltage boost.

During time t3, the operating conditions of the electronic switches are the same as during time t1; through the path from voltage VP2 through capacitor C2 to zero voltage VSS, VP2 charges capacitor C2 and forms the voltage potential VP2 across the two terminals of capacitor C2. At the same time, the C3A terminal of capacitor C3 connects to VP2, and the C3B terminal connects to zero voltage VSS; through the path from voltage VP2 through capacitor C3 to zero voltage VSS, VP2 charges capacitor C3 and forms the voltage potential VP2 across the two terminals of capacitor C3.

During time t4, electronic switches S21, S22, S23, S24, Sp and Sp4 are disconnected, and electronic switches S25, Sn, and Sn3 are conductive; the C2A terminal of capacitor C2 through electronic switch Sn3 connects to the input voltage VDD, the C2B terminal through electronic switch S25 connects to the C3A terminal of capacitor C3, and the C3B terminal of capacitor C3 through electronic switch Sn connects to output terminal VNx; through the path from voltage VDD through electronic switch Sn3, capacitor C2, electronic switch S25, capacitor C3, electronic switch Sn, output terminal VNx, and output capacitor C5 to zero voltage VSS, the output voltage at output terminal VNx is voltage VDD minus the voltage VP2 stored in capacitor C2 and voltage VP2 stored in capacitor C3 during time t3 to realize the −3 times VDD negative high voltage boost. If the power consumption of the electronic switches and capacitors are not considered, after repeatedly charging and discharging, high positive ouput voltage VPx=VSS+VP2+VP2=4VDD, and negative high output voltage VNx=VDD−VP2−VP2=−3VDD can be obtained.

Figure 21:
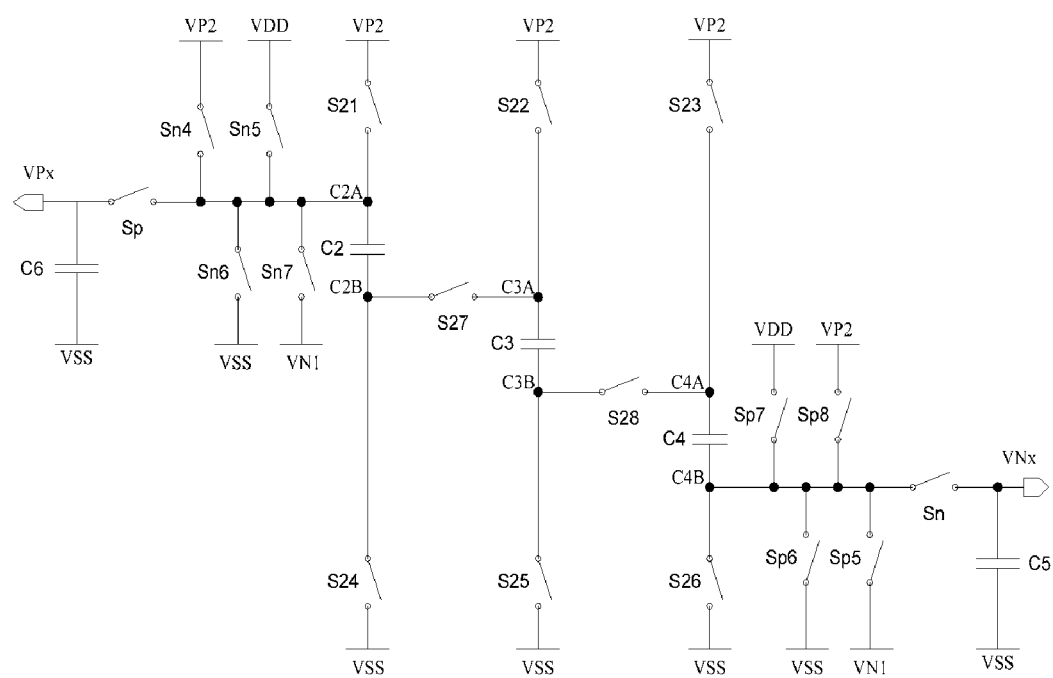
FIG. 21 is a structural diagram illustrating a second stage charge pump provided by the embodiments of this invention that shares three coupling capacitors.

FIG. 21 illustrates a structure for a second stage charge pump sharing 3 coupling capacitors, which can generate the positive and negative high voltages VPx=5VDD (or 6VDD, or 7VDD, or 8VDD) and VNx=−4VDD (or −5VDD, or −6VDD, or −7VDD). By controlling through the non-over-lapping time sequences, the electronic switches are operated to be conducting and non-conducting to charge and discharge the capacitors. The charge pump has 16 types of operating conditions, each one of which can be controlled and selected by numeric logic to provide 16 types of positive and negative output voltages.

In charging capacitors C2, C3 and C4 during the same time, electronic switches S21, S21, S23, S24, S25 and S26 are conducting, electronic switches S27, S28, Sp5, Sp6, Sp7, Sp8, Sn4, Sn5, Sn6, and Sn7 are disconnected. VP2 charges capacitors C2, C3, and C4 and forms VP2 voltage potential across the capacitors.

When capacitors C2, C3 and C4 are simultaneously pumping, when a pathway is opened (connected), the electronic switches of the other pathways are disconnected; voltage VPx=5VDD can be obtained through the pathway from input voltage VN1 through electronic switch Sp5, capacitor C4, capacitor C3, capacitor C2, output terminal VPx, and output capacitors C6 to VSS; voltage VPx=6VDD can be obtained through the pathway from zero voltage VSS through electronic switch Sp6, capacitor C4, capacitor C3, capacitor C2, output terminal VPx, and output capacitors C6 to VSS; voltage VPx=7VDD can be obtained through the pathway from voltage VDD through electronic switch Sp7, capacitor C4, capacitor C3, capacitor C2, output terminal VPx, and output capacitors C6 to VSS; voltage VPx=8VDD can be obtained through the pathway from voltage VP2 through electronic switch Sp8, capacitor C4, capacitor C3, capacitor C2, output terminal VPx, and output capacitors C6 to VSS; voltage VPx=−4VDD can be obtained through the pathway from voltage VP2 through electronic switch Sn4, capacitor C2, capacitor C3, capacitor C4, output terminal VNx, and output capacitors C5 to VSS; voltage VPx=−5VDD can be obtained through the pathway from voltage VP2 through electronic switch Sn5, capacitor C2, capacitor C3, capacitor C4, output terminal VNx, and output capacitors C5 to VSS; voltage VPx=−6VDD can be obtained through the pathway from voltage VSS through electronic switch Sn6, capacitor C2, capacitor C3, capacitor C4, output terminal VNx, and output capacitors C5 to VSS; and voltage VPx=−7VDD can be obtained through the pathway from voltage VN1 through electronic switch Sn7, capacitor C2, capacitor C3, capacitor C4, output terminal VNx, and output capacitors C5 to VSS.

Figure 22:
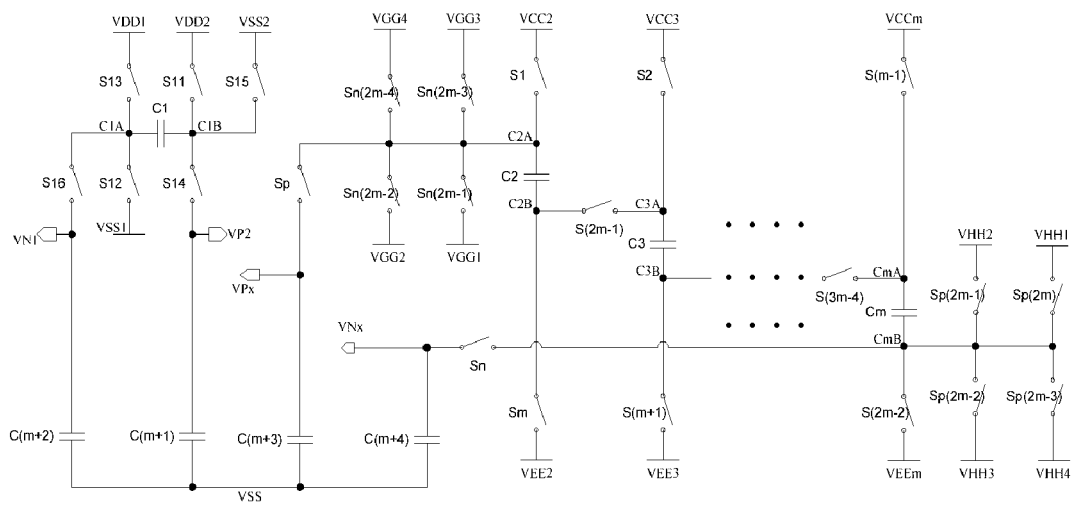
FIG. 22 is a structural diagram of a second stage charge pump of the embodiments of the present invention, providning a two-stage charge pump sharing m−1 coupling capacitors.

As illustrated by FIG. 22, in a second stage charge pump, in sharing (m−1) capacitors C2 and C3 to Cm, the positive and negative high voltages VPx and VNx are generated. By controlling through the non-overlapping time sequences, the electronic switches are operated to be conducting and non-conducting, and capacitors C2 and C3 to Cm are charged and discharged to realize the charge pump charging and discharging. The charge pump includes positive voltage charge pump(s) and negative voltage charge pump(s), and in this charging and discharging process, they share the same coupling capacitor(s).

C1 and C2 to Cm totaling (m−1) capacitors are serially connected under the control of the electronic switches S(2m−1) and S(2m) . . . S(3m−4), where m is a whole number larger or equal to 2. The first terminals of capacitors C2 and C3 . . . Cm respectively connect to electronic switches S1 and S2 . . . Sm−1; electronic switches S1 and S2 . . . Sm−1 respectively connect to VCC2 and VCC3 . . . VCCm, and respectively connect to capacitors C2 and C3 . . . Cm to connect/disconnect to voltages VCC2 and VCC3 . . . VCCm.

The second terminals of capacitors C2 and C3 . . . Cm respectively connect to electronic switches Sm and Sm+1 . . . S(2m−2), and respectively connect to VEE2 and VEE3 . . .

VEEm, and respectively connect to capacitors C2 and C3 . . . Cm to connect/disconnect to voltages VEE2 and VEE3 . . . VEEm.

Additionally, the first terminal of capacitor C2 connects to 4 electronic switches: Sn(2m−1), Sn(2m−2), Sn(2m−3), and Sn(2m−4); electronic switches Sn(2m−1), Sn(2m−2), Sn(2m−3), and Sn(2m−4), respectively, connect to VGG1, VGG2, VGG3, and VGG4 to control whether capacitor C2 is to connect to voltages VGG1, VGG2, VGG3, and VGG4. The first terminal of capacitor C2 connects to switch Sp, and the electronic switch connects to output terminal VPx to control whether capacitor C2 is to connect to output terminal VPx.

The first terminal of capacitor Cm, respectively, connects to electronic switches Sp(2m), Sp(2m−1), Sp(2m−2), and Sp(2m−3); electronic switches Sp(2m), Sp(2m−1), Sp(2m−2), and Sp(2m−3), respectively, connect to VHH1, VHH2, VHH3, and VHH4 to control whether capacitor Cm is to connect to voltages VHH1, VHH2, VHH3, and VHH4. The first terminal of electronic switch Sn connects to output terminal VNx, and the other terminal connects to the second terminal of capacitor Cm to control whether capacitor Cm is to connect to output terminal VNx.

The charge pump has 16 operating modes, which can be selected by numeric logic for a specific operating mode to output 16 different types of positive and negative high voltage. When disregarding electronic switch S(2m−4) that connects to the first terminal of capacitor C2 and the control for connecting capacitor C2 to input voltage VGG4, and disregarding electronic switch Sp(2m−3) that connects to the second terminal of capacitor Cm and the control for connecting capacitor Cm to input voltage VHH4, the charge pump has 9 operating modes.

Figure 23:
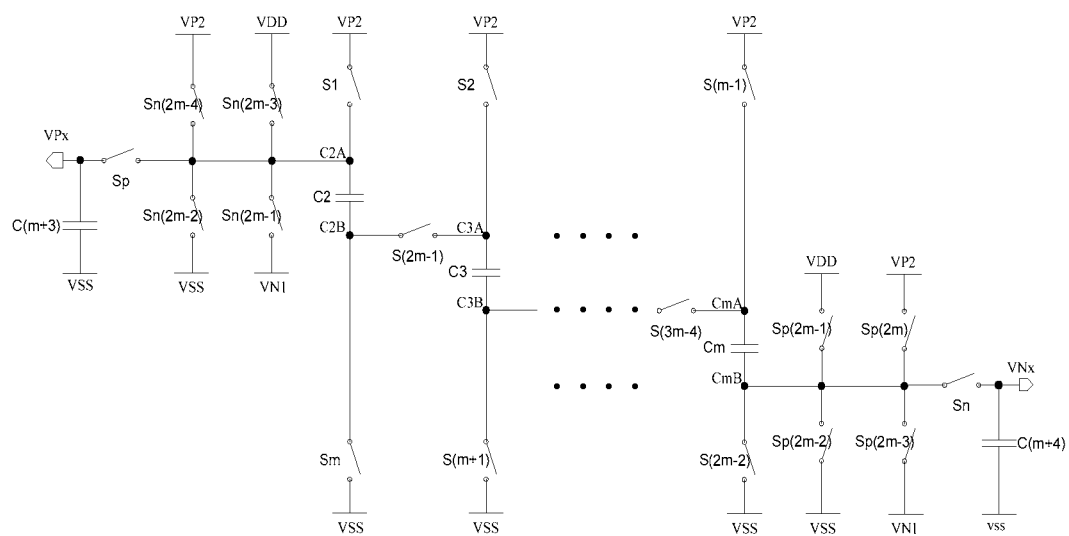
FIG. 23 is a structural diagram of the second stage charge pump illustrated in FIG. 22.

When VCC2=VCC3= . . . =VCCm=VP2, VEE2= VEE3= . . . =VEEm=VSS, VGG1=VN1, VGG2=VSS, VGG3=VDD, VGG4=VP2, VHH1=VP2, VHH2=VDD, VHH3=VSS, and VHH4=VN1, the following positive and negative high voltage output can be obtained: VPx=(2m−3)VDD, or VPx=(2m−2)VDD, or VPx=(2m−1)VDD, or VPx=(2m)VDD; VNx=−(2m−4)VDD, or VNx=−(2m−3)VDD, or VNx=−(2m−2)VDD, or VNx=−(2m−1)VDD, where the structure of the charge pump is as illustrated in FIG. 23.

When simultaneously charging capacitors C2, C3 to Cm, electronic switches S1, S2 to S(2m−2) are conductive, S(2m−1), S(2m) to S(3m−4) are non-conductive, electronic switches Sp, Sn, Sp(2m−3), Sp(2m−2), Sp(2m−1), Sp(2m), Sn(2m−4), Sn(2m−3), Sn(2m−2) and Sn(2m−1) are non-conductive, and input voltage VP2 is respectively charging C2, C3 to Cm, forming voltage potentials VP2 across the two terminals of capacitors.

When capacitors C2, C3 to Cm are simultaneously pumping, when a pathway is opened (connected), the electronic switches of the other pathways are disconnected; voltage VPx=(2m−3)VDD can be obtained through the pathway from voltage VN1 at the negative output terminal of first stage charge pump through electronic switch Sp(2m−3), capacitor Cm to capacitor C2, electronic switch Sp, output terminal VPx, and output capacitor C(m+3) to VSS; voltage VPx=(2m−2)VDD can be obtained through the pathway from voltage VSS through electronic switch Sp(2m−2), capacitor Cm to capacitor C2, electronic switch Sp, output terminal VPx, and output capacitor C(m+3) to VSS; voltage VPx=(2m−1)VDD can be obtained through the pathway from voltage VDD through electronic switch Sp(2m−1), capacitor Cm to capacitor C2, electronic switch Sp, output terminal VPx, and output capacitor C(m+3) to VSS; voltage VPx=(2m)VDD can be obtained through the pathway from voltage VP2 through electronic switch Sp(2m), capacitor Cm to capacitor C2, electronic switch Sp, output terminal VPx, and output capacitor C(m+3) to VSS; negative high voltage VNx=−Sn(2m−4)VDD can be obtained through the pathway from voltage VP2 through electronic switch Sn(2m−4), capacitor C2, capacitor C3 to capacitor Cm, electronic switch Sn, output terminal VNx, and output capacitor C(m+4) to VSS; negative high voltage VNx=−Sn(2m−3)VDD can be obtained through the pathway from voltage VDD through electronic switch Sn(2m−3), capacitor C2, capacitor C3 to capacitor Cm, electronic switch Sn, output terminal VNx, and output capacitor C(m+4) to VSS; negative high voltage VNx=−Sn(2m−2)VDD can be obtained through the pathway from voltage VSS through electronic switch Sn(2m−2), capacitor C2, capacitor C3 to capacitor Cm, electronic switch Sn, output terminal VNx, and output capacitor C(m+4) to VSS; and negative high voltage VNx=−Sn(2m−1)VDD can be obtained through the pathway from voltage VN1 at the negative output terminal of the first stage charge pump through electronic switch Sn(2m−1), capacitor C2, capacitor C3 to capacitor Cm, electronic switch Sn, output terminal VNx, and output capacitor C(m+4) to VSS.

In the embodiments of the present invention, the capacitors can be inside the chip or outside of the chip, and the switches can be MOS transistor or likewise on-off components.

In the embodiments of the present invention, coupling capacitors are shared during the processes of the positive and negative charge pumps charging and discharging, and operate at alternating intervals through sequence-control. As a result, both positive and negative voltage output with adjustable voltage boost can be simultaneously achieved where the boost rate can be selected through numeric logic. Through the embodiments of the present invention, the die size and the manufacturing cost of the charge pump can be greatly reduced, and the charge pump has a design that is simple and easy to produce.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A charge pump apparatus, providing multiple positive and negative voltages, comprising:
   a capacitor set;
   multiple electronic switches connected to said capacitor set and a plurality of voltage sources;
   multiple output capacitors connected to selected ones of said multiple electronic switches and one or more output terminals; and
   a non-overlapping time sequence that controls the on and off states of said multiple electronic switches;
   wherein under the control of said non-overlapping time sequence, corresponding electronic switches are turned on and off to control the output of the positive and negative voltages provided by said output capacitors to generate output voltages that are pre-determined multiples of two or more input voltages;
   wherein said multiple electronic switches includes a first electronic switch, a second electronic switch, a third electronic switch, a fourth electronic switch, a fifth electronic switch, and a sixth electronic switch, and wherein said capacitor set includes a capacitor having a first terminal and a second terminal, the first terminal of said capacitor connects to the first, second, and third electronic switches, and the second terminal connects to the fourth, fifth, and sixth electronic switches;

wherein the first electronic switch connects to a first voltage, the second electronic switch connects to a second voltage, and the third electronic switch connects to a terminal of a first output voltage;

wherein the fourth electronic switch connects to a third voltage, the fifth electronic switch connects to a fourth voltage, and the sixth electronic voltage connects to a terminal of a second output voltage; and wherein the first voltage, the second voltage, the third voltage, and the fourth voltage are capable of being varied to adjust the first output voltage and the second output voltage.

2. The charge pump apparatus of claim 1, wherein when said first voltage equals to said fourth voltage, which equals to a zero-potential voltage, and the second voltage equals to the third voltage, said charge pump apparatus outputs a 2 times increased voltage and a −1 time increased voltage.

3. The charge pump apparatus of claim 1, wherein said capacitor set includes m capacitors, C1 to Cm, where m is greater than or equal to 2;

wherein with the control of electronic switches S(2m+1), S(2m+2) to S(3m−1), said m capacitors are serially connected in succession; where the first terminals of the capacitors C1 to Cm are connected to the electronic switches S1 to Sm, respectively, and the electronic switches S1 to Sm connect to voltages VCC1 to VCCm, respectively; the second terminals of the capacitors C1 to Cm connect to electronic switches S(m+1) to S(2m), respectively, and electronic switches S(m+1) to S(2m) connect to voltages VEE1 to VEEm, respectively;

the first terminal of capacitor C1 also connects to electronic switches Sn(m), Sn(m+1), and Sp; the electronic switches Sn(m), Sn(m+1), and Sp respectively connect to voltages VGG1, VGG2, and a positive high-voltage output terminal VPx; and the second terminal of capacitor Cm also connects separately to electronic switches Sp(m+1), Sp(m), and Sn; the electronic switches Sp(m+1), Sp(m), and Sn respectively connect to voltages VHH1, VHH2, and a negative high-voltage output terminal VNx.

4. The charge pump apparatus of claim 3, wherein when VCC1=VCC2= . . . =VCCm=VDD and voltage VEE1=VEE2= . . . =VEEm=0, output voltage is selectively one of the following: (1) VPx=mVDD and VNx=−mVDD, (2) VPx=mVDD and VNx=−(m−1)VDD, (3) VPx=(m+1)VDD and VNx=−mVDD, and (4) VPx=(m+1)VDD and VNx=−(m−1)VDD.

5. The charge pump apparatus of claim 1, wherein said non-overlapping time sequence is controlled through digital logic.

6. The charge pump apparatus of claim 1, wherein said charge pump apparatus is a multiple-stage cascaded charge pump.

7. The charge pump apparatus of claim 6, wherein said charge pump is a two-stage charge pump, wherein the capacitor set of a first stage charge pump includes a capacitor, the first terminal of said capacitor connects separately to the first, second, and third electronic switches, and the second terminal connects separately to the fourth, fifth, and sixth electronic switches;

said first electronic switch connects a first voltage, said second electronic switch connects to a second voltage, and said third electronic switch connects to the terminal of a first output voltage; and said fourth electronic switch connects to the third voltage, said fifth electronic switch connects to the fourth voltage, and said sixth electronic switch connects to the terminal of a second output voltage.

8. The charge pump apparatus of claim 6, wherein the capacitor set of a second stage charge pump includes m−1 capacitors C2 to Cm, where m is greater than or equal to 2;

wherein with the control of electronic switches S(2m−1), S(2m), to S(3m−4), said m−1 capacitors are serially connected in succession, where the first terminals of capacitors C2 to Cm are connected to electronic switches S1 to S(m−1), respectively, and electronic switches S1 to S(m−1) connect to voltages VCC2 to VCCm, respectively, and the second terminals of capacitors C2 to Cm connect to electronic switches S(m) to S(2m−2), respectively, and electronic switches S(m) to S(2m−2) connect to voltages VEE2 to VEEm, respectively;

the first terminal of capacitor C2 also connects to electronic switches Sn(2−1), Sn(2m−2), Sn(2m−3), Sn(2m−4), and Sp; electronic switches Sn(2m−1), Sn(2m−2), Sn(2m−3), Sn(2m−4), and Sp separately connect to voltages VGG1, VGG2, VGG3, VGG4, and a positive high-voltage from an output terminal VPx; and the second terminal of capacitor Cm also connects separately to electronic switches Sp(2m), Sp(2m−1), Sp(2m−2), Sp(2m−3), and Sn; electronic switches Sp(2m), Sp(2m−1), Sp(2m−2), Sp(2m−3), and Sn separately connect to voltages VHH1, VHH2, VHH3, VHH4, and a negative high-voltage from an output terminal VNx.

9. The charge pump apparatus of claim 6, wherein for said multi-stage cascaded charge pumps, the voltage output by a preceding charge pump stage serves as the input voltage for a succeeding charge pump stage.

10. A charge pump apparatus, wherein said charge pump apparatus includes multi-stage cascaded charge pumps, wherein each charge pump stage provides outputs of multiple positive and negative voltages, comprising:

a capacitor set;

multiple electronic switches connected to said capacitor set;

multiple output capacitors; and a non-overlapping sequence controlling the on or off states of said multiple electronic switches;

wherein under the control of said non-overlapping time sequence, corresponding electronic switches are turned on and off to control the output of the positive and negative voltages provided by said output capacitors to generate output voltages that are pre-determined multiples of two or more input voltages;

wherein said charge pump apparatus is a two-stage cascaded charge pump;

wherein said multiple electronic switches includes a first electronic switch, a second electronic switch, a third electronic switch, a fourth electronic switch, a fifth electronic switch, and a sixth electronic switch, and wherein the capacitor set of a first stage charge pump includes a capacitor, the first terminal of said capacitor connects separately to the first, second, and third electronic switches, and the second terminal connects separately to the fourth, fifth, and sixth electronic switches;

said first electronic switch connects a first voltage, said second electronic switch connects to a second voltage, and said third electronic switch connects to the terminal of a first output voltage;

said fourth electronic switch connects to the third voltage, said fifth electronic switch connects to the fourth voltage, and said sixth electronic switch connects to the terminal of a second output voltage; and wherein the first voltage, the second voltage, the third voltage, and the fourth voltage are capable of being varied to adjust the first output voltage and the second output voltage.

11. The charge pump apparatus of claim 10, wherein the capacitor set of a second stage charge pump includes m−1 capacitors C2 to Cm, where m is greater than or equal to 2;

wherein with the control of electronic switches S(2m−1), S(2m), to S(3m−4), said m−1 capacitors are serially connected in succession, where the first terminals of capacitors C2 to Cm are connected to electronic switches S1 to S(m−1), respectively, and electronic switches S1 to S(m−1) connect to voltages VCC2 to VCCm, respectively, and the second terminals of capacitors C2 to Cm connect to electronic switches S(m) to S(2m−2), respectively, and electronic switches S(m) to S(2m−2) connect to voltages VEE2 to VEEm, respectively;

the first terminal of capacitor C2 also connects to electronic switches Sn(2m−1), Sn(2m−2), Sn(2m−3), Sn(2m−4), and Sp; electronic switches Sn(2m−1), Sn(2m−2), Sn(2m−3), Sn(2m−4), and Sp separately connect to voltages VGG1, VGG2, VGG3, VGG4, and a positive high-voltage from an output terminal VPx; and the second terminal of capacitor Cm also connects separately to electronic switches Sp(2m), Sp(2m−1), Sp(2m−2), Sp(2m−3), and Sn; electronic switches Sp(2m), Sp(2m−1), Sp(2m−2), Sp(2m−3), and Sn separately connect to voltages VHH1, VHH2, VHH3, VHH4, and a negative high-voltage from an output terminal VNx.

12. The charge pump apparatus of claim 10, wherein for said multi-stage cascaded charge pumps, the voltage output by a preceding charge pump stage serves as the input voltage for a succeeding charge pump stage.

13. The charge pump apparatus of claim 10, wherein said non-overlapping time sequence is controlled through digital logic.

14. A power source circuit, wherein said power source circuit includes:

a charge pump apparatus that provides outputs of multiple positive and negative voltages; and an output apparatus that is connected to the charge pump apparatus and outputs the non-overlapping sequence that controls the operation of said charge pump apparatus;

said charge pump apparatus includes:

a capacitor set wherein said capacitor set includes m capacitors, C1 to Cm, where m is greater than or equal to 2 and wherein the m capacitors are connected in series;

multiple electronic switches connected to said capacitor set;

multiple output capacitors; and a non-overlapping time sequence that controls the on and off states of said multiple electronic switches;

wherein under the control of said non-overlapping time sequence, corresponding electronic switches are turned on and off to control the output of the positive and negative voltages provided by said output capacitors to generate output voltages that are pre-determined multiples of two or more input voltages;

wherein said multiple electronic switches includes a first electronic switch, a second electronic switch, a third electronic switch, a fourth electronic switch, a fifth electronic switch, and a sixth electronic switch, and wherein said capacitor set includes a capacitor having a first terminal and a second terminal, the first terminal of said capacitor connects to the first, second, and third electronic switches, and the second terminal connects to the fourth, fifth, and sixth electronic switches;

wherein the first electronic switch connects to a first voltage, the second electronic switch connects to a second voltage, and the third electronic switch connects to a terminal of a first output voltage;

wherein the fourth electronic switch connects to a third voltage, the fifth electronic switch connects to a fourth voltage, and the sixth electronic voltage connects to a terminal of a second output voltage; and wherein the first voltage, the second voltage, the third voltage, and the fourth voltage are capable of being varied to adjust the first output voltage and the second output voltage.

15. The power source circuit of claim 14, wherein said non-overlapping time sequence is controlled through digital logic.

* * * * *